(12) United States Patent
Li et al.

(10) Patent No.: US 7,941,009 B2
(45) Date of Patent: May 10, 2011

(54) REAL-TIME COMPUTERIZED ANNOTATION OF PICTURES

(75) Inventors: Jia Li, State College, PA (US); James Z. Wang, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 828 days.

(21) Appl. No.: 11/872,260

(22) Filed: Oct. 15, 2007

(65) Prior Publication Data

US 2009/0204637 A1 Aug. 13, 2009

Related U.S. Application Data

(63) Continuation-in-part of application No. 10/820,948, filed on Apr. 8, 2004, now Pat. No. 7,394,947.

(60) Provisional application No. 60/461,391, filed on Apr. 8, 2003, provisional application No. 60/829,556, filed on Oct. 16, 2006.

(51) Int. Cl.
*G06K 9/54* (2006.01)
*G06F 7/00* (2006.01)
(52) U.S. Cl. ........................................ 382/305; 707/705
(58) Field of Classification Search .......... 382/159–160, 382/162, 173, 224–231, 278, 298–300, 305, 382/312; 704/7, 240, 270; 707/705, 766; 706/48; 715/202
See application file for complete search history.

(56) References Cited

U.S. PATENT DOCUMENTS

| 6,606,623 | B1 * | 8/2003 | Hsieh et al. ................... 707/766 |
| 6,725,195 | B2 * | 4/2004 | Sankar et al. .................. 704/240 |
| 7,010,477 | B1 * | 3/2006 | Iwahashi .......................... 704/7 |
| 7,028,250 | B2 * | 4/2006 | Ukrainczyk et al. .......... 715/202 |
| 7,043,474 | B2 * | 5/2006 | Mojsilovic et al. .................. 1/1 |
| 7,117,192 | B2 * | 10/2006 | Waltz et al. ..................... 706/48 |
| 7,124,149 | B2 | 10/2006 | Smith et al. |
| 7,194,134 | B2 | 3/2007 | Bradshaw et al. |
| 7,215,828 | B2 | 5/2007 | Luo |
| 7,286,987 | B2 * | 10/2007 | Roy .............................. 704/270 |
| 2004/0100510 | A1 | 5/2004 | Milic-Frayling et al. |
| 2005/0114325 | A1 | 5/2005 | Liu et al. |
| 2006/0007315 | A1 | 1/2006 | Singh |
| 2006/0087517 | A1 | 4/2006 | Mojsilovic |
| 2006/0101060 | A1 | 5/2006 | Li et al. |

OTHER PUBLICATIONS

Jia Li and James Z. Wang, "Studying Digital Imagery of Ancient Paintings by Mixtures of Stochastic Models," IEEE Transactions on Image Processing, vol. 13, No. 3, pp. 340-353, 2004.

(Continued)

*Primary Examiner* — Kanji Patel
(74) *Attorney, Agent, or Firm* — Gifford, Krass, Sprinkle, Anderson & Citkowski, P.C.; Douglas L. Wathen

(57) ABSTRACT

A computerized annotation method achieves real-time operation and better optimization properties while preserving the architectural advantages of the generative modeling approach. A novel clustering algorithm for objects is represented by discrete distributions, or bags of weighted vectors, thereby minimizing the total within cluster distance, a criterion used by the k-means algorithm. A new mixture modeling method, the hypothetical local mapping (HLM) method, is used to efficiently build a probability measure on the space of discrete distributions. Thus, in accord with the invention every image is characterized by a statistical distribution. The profiling model specifies a probability law for distributions directly.

7 Claims, 15 Drawing Sheets

OTHER PUBLICATIONS

Jia Li and James Z. Wang, "Automatic Linguistic Indexing of Pictures by a Statistical Modeling Approach," IEEE Transactions on Pattern Analysis and Machine Intelligence, vol. 25, No. 9, pp. 1075-1088, 2003.

Yixin Chen and James Z. Wang, "Support Vector Learning for Fuzzy Rule-Based Classification Systems," IEEE Transactions on Fuzzy Systems, vol. 11, No. 6, pp. 716-728, 2003.

James Z. Wang, Jia Li and Sui Ching Lin, "Evaluation Strategies for Automatic Linguistic Indexing of Pictures," Proceedings of the IEEE International Conference on Image Processing (ICIP), vol. 3, pp. 617-620, Barcelona, Spain, IEEE, Sep. 2003.

Yixin Chen, James Z. Wang and Robert Krovetz, "An Unsupervised Learning Approach to Content-Based Image Retrieval," Proceedings of the IEEE International Symposium on Signal Processing and its Applications, vol. 1, pp. 197-200, Paris, France, Jul. 2003.

Yixin Chen and James Z. Wang, "Kernel Machines and Additive Fuzzy Systems: Classification and Function Approximation," Proceedings of the IEEE International Conference on Fuzzy Systems, pp. 789-795, St. Louis, MO, 2003.

Yixin Chen and James Z. Wang, "Looking Beyond Region Boundaries: A Robust Image Similarity Measure Using Fuzzified Region Features," Proceedings of the IEEE International Conference on Fuzzy Systems, pp. 1165-1170, St. Louis, MO, 2003.

Yixin Chen, James Z. Wang and Robert Krovetz, "Content-Based Image Retrieval by Clustering," Proceedings of the 5th International Workshop on Multimedia Information Retrieval, in conjuction with ACM Multimedia, pp. 193-200, Berkeley, CA, ACM, Nov. 2003.

James Z. Wang, Jia Li and Ching-chih Chen, "Machine Annotation for Digital Imagery of Historical Materials Using the ALIP System," Proceedings of the DELOS-NSF Workshop on Multimedia in Digital Libraries, 5 pages, Crete, Greece, 2003. Ine-proceedings.

Yixin Chen and James Z. Wang, "A Region-Based Fuzzy Feature Matching Approach to Content-Based Image Retrieval," IEEE Transactions on Pattern Analysis and Machine Intelligence, vol. 24, No. 9, pp. 1252-1267, 2002.

James Z. Wang and Jia Li, "Learning-Based Linguistic Indexing of Pictures with 2-D MHMMs," Proceedings of the ACM Multimedia Conference, pp. 436-445, Juan Les Pins, France, ACM, Dec. 2002.

Ching-chih Chen and James Z. Wang, "Large-Scale Emperor Digital Library and Semantics-Sensitive Region-Based Retrieval," Proceedings of the International Conference on Digital Library—IT Opportunities and Challenges in the New Millennium, pp. 454-462, Beijing, China, Jul. 9-11, 2002.

James Z. Wang, Jia Li and Ching-chih Chen, "Interdisciplinary Research to Advance Digital Imagery Indexing and Retrieval Technologies for Asian Art and Cultural Heritages," Proceedings of the 4th International Workshop on Multimedia InformationRetrieval, in conjunction with ACM Multimedia, 6 pages, Juan Les Pins, France, ACM, Dec. 2002.

James Z. Wang and Jia Li, "Mining Digital Imagery Data for Automatic Linguistic Indexing of Pictures," Proceedings of the NSF Workshop on Next Generation Data Mining, pp. 69-76, Baltimore, MD, Nov. 2002.

DELOS-NSF Working Group, "Research on Digital Imagery for Significant Cultural and Historical Materials," DELOS-NSF Working Group Reports, 19 pages, Boston, MA, Dec. 2002.

James Z. Wang, Jia Li and Gio Wiederhold, "SIMPLIcity: Semantics-Sensitive Integrated Matching for Picture Libraries," IEEE Transactions on Pattern Analysis and Machine Intelligence, vol. 23, No. 9, pp. 947-963, 2001.

James Z. Wang, Jia Li, Robert M. Gray and Gio Wiederhold, "Unsupervised Multiresolution Segmentation for Images with Low Depth of Field," IEEE Transactions on Pattern Analysis and Machine Intelligence, vol. 23, No. 1, pp. 85-90, 2001.

Yanping Du and James Z. Wang "A Scalable Integrated Region-Based Image Retrieval System," Proceedings of the IEEE International Conference on Image Processing (ICIP), Thessaloniki, Greece, pp. 22-25, IEEE, Oct. 2001.

Yixin Chen, James Z. Wang and Jia Li, "FIRM: Fuzzily Integrated Region Matching for Content-Based Image Retrieval," Proceedings of the ACM Multimedia Conference, pp. 543-545, Ottawa, Canada, ACM, Sep. 2001.

James Z. Wang, "Security Filtering of Medical Images Using OCR," Digital Libraries: Advanced Methods and Technologies, Digital Collections, Proceedings of the Third All-Russian Scientific Conference, pp. 118-122, Petrozavodsk, Russia, Sep. 2001.

James Z. Wang and Yanping Du, "RF IPF: A Weighting Scheme for Multimedia Information Retrieval," Proceedings of the IEEE International Conference on Image Analysis and Processing (ICIAP), pp. 380-385, Palermo, Italy, IEEE, 2001.

James Z. Wang and Yanping Du, "Scalable Integrated Region-Based Image Retrieval Using IRM and Statistical Clustering," Proceedings of the ACM and IEEE Joint Conference on Digital Libraries, pp. 268-277, Roanoke, VA, ACM, Jun. 2001.

Yixin Chen and James Z. Wang, "Looking Beyond Region Boundaries: Region-Based Image Retrieval Using Fuzzy Feature Matching," Proceedings of the Multimedia Content-Based Indexing and Retrieval Workshop, INRIA Rocquencourt, France, pp. 37-40, Sep. 2001.

James Z. Wang, Jia Li and Gio Wiederhold, "SIMPLIcity: Semantics-Sensitive Integrated Matching for Picture Libraries," Lecture Notes in Computer Science, Advances in visual information systems, Lyon, France, Robert Laurini (ed.), vol. 1929, pp. 360-371, Springer-Verlag, Nov. 2000.

James Z. Wang, "Pathfinder: Multiresolution Region-Based Searching of Pathology Images Using IRM," Journal of the American Medical Informatics Association, Proceedings of the AMIA Annual Symposium, vol. 2000 symposium suppl., pp. 883-887, LosAngeles, Ca, Nov. 2000.

James Z. Wang, "SIMPLIcity: A Region-Based Image Retrieval System for Picture Libraries and Biomedical Image Databases," Proceedings of the ACM Multimedia Conference, pp. 483-484, Los Angeles, CA, ACM, Oct. 2000.

James Z. Wang, "Region-Based Retrieval of Biomedical Images," Proceedings of the ACM Multimedia Conference, pp. 511-512, Los Angeles, CA, ACM, Oct. 2000.

Jia Li, James Z. Wang and Gio Wiederhold, "IRM: Integrated Region Matching for Image Retrieval," Proceedings of the ACM Multimedia Conference, pp. 147-156, Los Angeles, CA, ACM, Oct. 2000.

Jia Li, James Z. Wang and Gio Wiederhold, "Classification of Textured and Non-Textured Images Using Region Segmentation," Proceedings of the IEEE International Conference on Image Processing (ICIP), Vancouver, BC, Canada, pp. 754-757, IEEE, Sep. 2000.

* cited by examiner

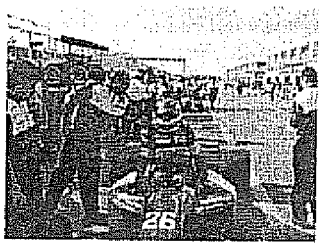
people, man-made, car, landscape, bus, boat, sport, royal guard, ocean

flower, plant, rose, cactus, flora, grass, landscape, water, perennial

indoor, food, dessert, man-made, bath, kitchen, texture, landscape, bead

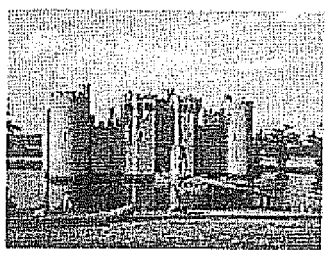
landscape, building, historical, mountain, man-made, indoor, people, lake, animal

grass, people, animal, horse, rural, dog, landscape, tribal, plant

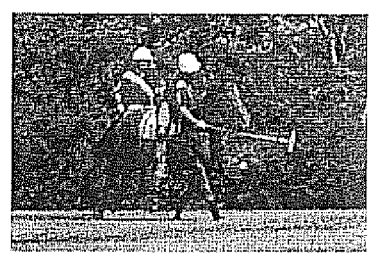
grass, animal, wild life, sport, people, rock, tree, horse, polo

texture, indoor, food, natural, people, animal, landscape, rock, man-made

landscape, indoor, color, sky, sunset, sun, bath, kitchen, mountain

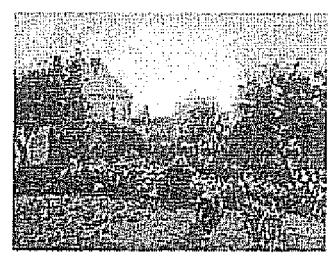
grass, landscape, house, rural, horse, animal, people, plant, flower

people, landscape, animal, cloth, female, painting, face, male, man-made

man-made, indoor, painting, people, food, fruit, mural, old, poster

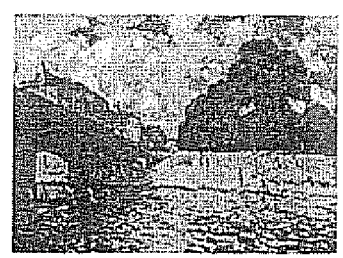
grass, landscape, tree, lake, autumn, people, rural, texture, natural

FIGURE 10

REAL-TIME COMPUTERIZED ANNOTATION OF PICTURES

REFERENCE TO RELATED APPLICATIONS

This application claims priority to U.S. Provisional Patent Application Ser. No. 60/829,556, filed Oct. 16, 2006. This application is also a continuation-in-part of U.S. patent application Ser. No. 10/820,948, filed Apr. 8, 2004, which claims priority to U.S. Provisional Patent Application Ser. No. 60/461,391, filed Apr. 9, 2003, the entirety of each application being incorporated herein by reference.

STATEMENT OF GOVERNMENT SPONSORSHIP

This invention was made with government support under Grant Nos. 0347148, 0219272 and 0202007, awarded by The National Science Foundation. The Government has certain rights in this invention.

FIELD OF THE INVENTION

This invention relates generally to picture annotation and, in particular, to statistical modeling and optimization techniques used to train computers about semantic concepts using example pictures from each concept.

BACKGROUND OF THE INVENTION

Image archives on the Internet are growing at a phenomenal rate. With digital cameras becoming increasingly affordable and the widespread use of home computers possessing hundreds of gigabytes of storage, individuals nowadays can easily build sizable personal digital photo collections. Photo sharing through the Internet has become a common practice. According to reports released recently, an Internet photo-sharing startup, flickr.com, has several million registered users and hosts several hundred million photos, with new photos in the order of one million being added on a daily basis. More specialized online photo-sharing communities, such as photo.net and airliners.net, also have databases in the order of millions of images entirely contributed by the users.
The Problem Image search provided by major search engines such as Google, MSN, and Yahoo! relies on textual descriptions of images found on the Web pages containing the images and the file names of the images. These search engines do not analyze the pixel content of images and hence cannot be used to search unannotated image collections. Fully computerized or computer-assisted annotation of images by words is a crucial technology to ensure the "visibility" of images on the Internet, due to the complex and fragmented nature of the networked communities.

Example pictures from the Website flickr.com. User-supplied tags: (a) 'dahlia', 'golden', 'gate', 'park', 'flower', and 'fog'; (b) 'cameraphone', 'animal', 'dog,', and 'tyson'.

Although owners of digital images can be requested to provide some descriptive words when depositing the images, the annotation tends to be highly subjective. Take an example of the pictures shown in FIG. 1. The users on flickr.com annotated the first picture by the tags 'dahlia', 'golden', 'gate', 'park', 'flower', and 'fog' and the second picture by 'cameraphone', 'animal', 'dog', and 'tyson'. While the first picture was taken at the Golden Gate Park near San Francisco according to the photographer, this set of annotation words can be a problem because this picture may show up when other users are searching for images of gates. The second picture may show up when users search for photos of various camera phones.

A computerized system that accurately suggests annotation tags to users can be very useful. If a user is too busy, he or she can simply check off those relevant words and type in other words. The system can also allow trained personnel to check the words with the image content at the time a text-based query is processed. However, automatic annotation or tagging of images with a large number of concepts is extremely challenging, a major reason that real-world applications have not appeared.

Human beings use a lot of background knowledge when we interpret an image. With the endowed capability of imagination, we can often see what is not captured in the image itself. For example, when we look at the picture in FIG. 2A, we know it is a race car although only a small portion of the car is shown. We can imagine in our mind the race car in three dimensions. If an individual has never seen a car or been told about cars in the past, he is unlikely to understand what this picture is about, even if he has the ability to imagine. Based on the shining paint and the color of the rubber tire, we can conclude that the race car is of very high quality. Similarly, we realize that the girl in FIG. 2B is spinning based on the perceived movements with respect to the background grass land and her posture. Human beings are not always correct in image interpretation. For example, a nice toy race car may generate the same photograph as in FIG. 2A. Computer graphics techniques can also produce a picture just like that.

Without a doubt, it is very difficult, if at all possible, to empower computers with the capability of imagining what is absent in a picture. However, we can potentially train computers by examples to recognize certain concepts. Such training techniques are valuable for annotating not only photographic images taken by home digital cameras but also the ever increasing digital images in scientific research experiments. In biomedicine, for instance, modem imaging technologies reveal to us tissues and portions of our body in finer and finer details, and with different modalities. With the vast amount of image data we generate, it has become a serious problem to examine all the data manually. Statistical or machine learning based technologies can potentially allow computers to screen such images before scientists spend their precious time on them.
Prior Related Work The problem of automatic image annotation is closely related to that of content-based image retrieval. Since the early 1990s, numerous approaches, both from academia and the industry, have been proposed to index images using numerical features automatically-extracted from the images. Smith and Chang developed of a Web image retrieval system. In 2000, Smeulders et al. published a comprehensive survey of the field. Progresses made in the field after 2000 is documented in a recent survey article. We review here some work closely related to ours. The references listed below are to be taken as examples only. Readers are urged to refer to survey articles for more complete references of the field.

Some initial efforts have recently been devoted to automatically annotating pictures, leveraging decades of research in computer vision, image understanding, image processing, and statistical learning, Generative modeling, statistical boosting, visual templates, Support Vector Machines, multiple instance learning, active learning, latent space models, spatial context models, feedback learning and manifold learning have been applied to image classification, annotation, and retrieval.

Our work is closely related to generative modeling approaches. In 2002, we developed the ALIP annotation system by profiling categories of images using the 2-D Multi-resolution Hidden Markov Model (MHMM). Images in every category focus on a semantic theme and are described collectively by several words, e.g., "sail, boat, ocean" and "vineyard, plant, food, grape". A category of images is consequently referred to as a semantic concept. That is, a concept in our system is described by a set of annotation words. In our experiments, the term concept can be interchangeable with the term category (or class). To annotate a new image, its likelihood under the profiling model of each concept is computed. Descriptive words for top concepts ranked according to likelihoods are pooled and passed through a selection procedure to yield the final annotation. If the layer of word selection is omitted, ALIP essentially conducts multiple classification, where the classes are hundreds of semantic concepts.

Classifying images into a large number of categories has also been explored recently by Clien et al. for the purpose of pure classification and Carneiro et al. for annotation using multiple instance learning. Barnard et al. aimed at modeling the relationship between segmented regions in images and annotation words. A generative model for producing image segments and words is built based on individually annotated images. Given a segmented image, words are ranked and chosen according to their posterior probabilities under the estimated model. Several forms of the generative model were experimented with and compared against each other.

The early research has not investigated real-time automatic annotation of images with a vocabulary of several hundred words. For example, as reported, the system takes about 15-20 minutes to annotate an image on a 1.7 GHz Intel-based processor, prohibiting its deployment in the real-world for Web-scale image annotation applications. Existing systems also lack performance evaluation in real-world deployment, leaving the practical potential of automatic annotation largely unaddressed. In fact, most systems have been tested using images in the same collection as the training images, resulting in bias in evaluation. In addition, because direct measurement of annotation accuracy involves labor intensive examination, substitutive quantities related to accuracy have often been used instead.

SUMMARY OF THE INVENTION

This invention resides in an annotation method that achieves real-time operation and better optimization properties while preserving the architectural advantages of the generative modeling approach. Models are established for a large collection of semantic concepts. The approach is inherently cumulative because when images of new concepts are added, the computer only needs to learn from the new images. What has been learned about previous concepts is stored in the form of profiling models and needs no re-training.

The invention takes advantage of new methods for clustering and mixture modeling that are expected to be applicable to problems involving data other than images. A novel clustering algorithm for objects is represented by discrete distributions, or bags of weighted vectors. This new algorithm minimizes the total within cluster distance, a criterion used by the k-means algorithm. We call the algorithm D2-clustering, where D2 stands for discrete distribution. D2-clustering generalizes the k-means algorithm from the data form of vectors to sets of weighted vectors. Although under the same spirit as k-means, D2-clustering involves much more sophisticated optimization techniques. We have also constructed a new mixture modeling method, the hypothetical local mapping (HLM) method, to efficiently build a probability measure on the space of discrete distributions.

The breakthrough in computational efficiency results from a fundamental change in the modeling approach. In ALIP, every image is characterized by a set of feature vectors residing on grids at several resolutions. The profiling model of each concept is the probability law governing the generation of feature vectors on 2-D grids. Under the new approach, every image is characterized by a statistical distribution. The profiling model specifies a probability law for distributions directly.

BRIEF DESCRIPTION OF THE DRAWINGS

FIG. 10 shows automatic annotation for photographs and paintings;

DETAILED DESCRIPTION OF THE INVENTION

Training

The training procedure is composed of the following steps. Label the concept categories by $\{1,2,\ldots,M\}$. A Corel database is used for training with M=599. Denote the concept to which image i belongs by $g_i$, $g_i \in \{1,2,\ldots,M\}$.

1) Extract a signature for each image i, $i \in \{1,2,\ldots,N\}$. Denote the signature by $\beta_i$, $\beta_i \in \Omega$. The signature consists of two discrete distributions, one of color features, and the other of texture features. The distributions on each type of features across different images have different supports, 2) For each concept $m \in \{1,2,\ldots,M\}$, construct a profiling model $M_m$ using the signatures of images belonging to concept m: $\{\beta_i : g_i=m, 1 \leq i \leq N\}$. Denote the probability density function under model $M_m$ by $\phi(s|M_m)$, $s \in \Omega$.

Figure 1A:
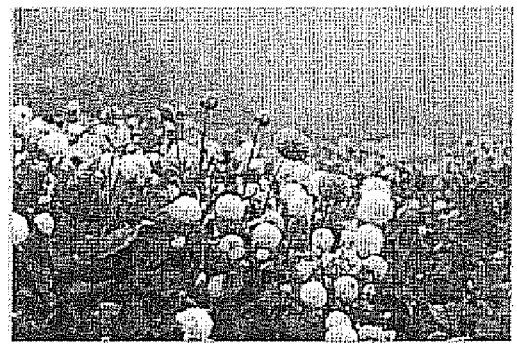
FIG. 1A is an example picture from the website flickr.com showing user-supplied tags "dahlia," "golden," "gate,", "park," "flowers," and "fog;"
Figure 1B:
FIG. 1B is an example picture from the website flickr.com showing user-supplied tags "cameraphone," "animal," "dog," and "tyson;"
Figure 2A:
FIGS. 2A and 2B illustrates how human beings can image objects, parts of objects or concepts not captured in the image.
Figure 2B:
Figure 3:
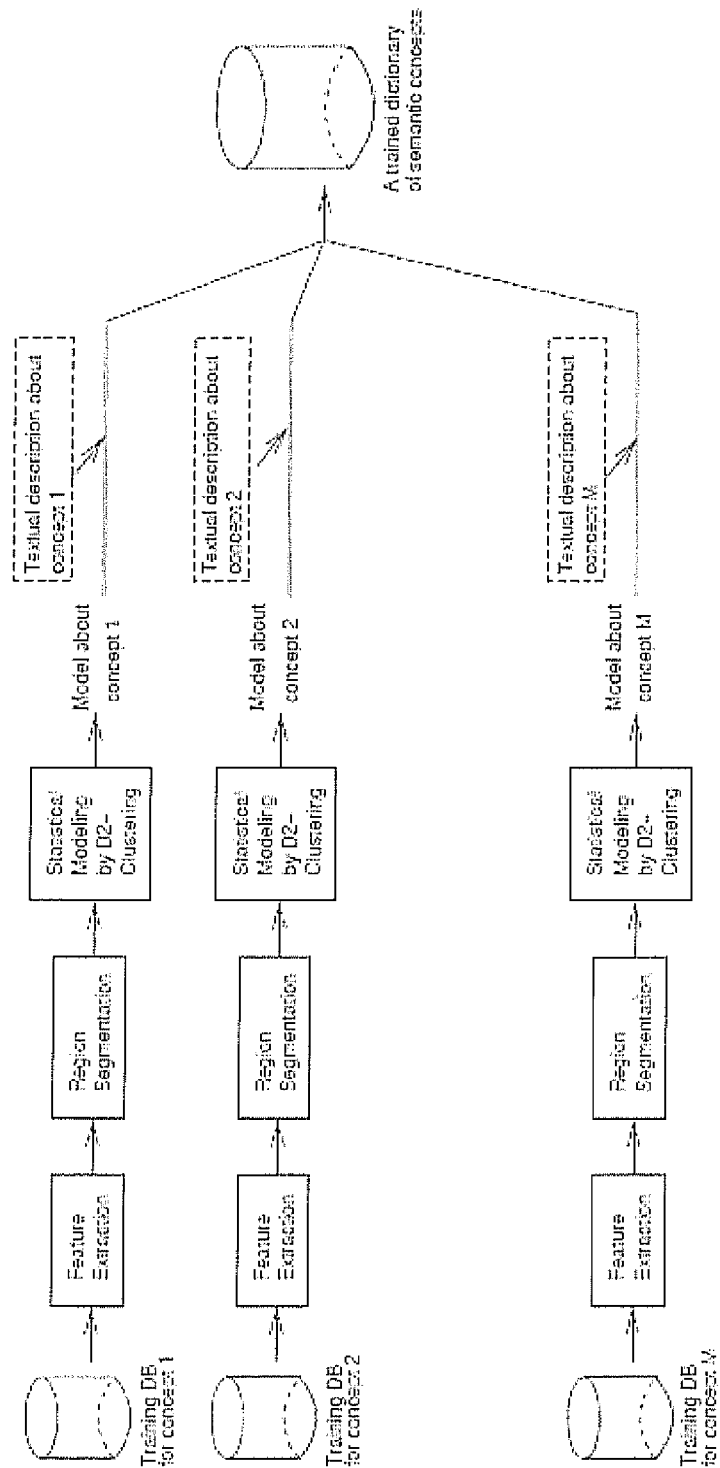
FIG. 3 shows the training process of the ALIPR system.

FIG. 3 illustrates this training process. The annotation process based upon the models will be described in subsequent sections.

The Training Database

It is well known that applying learning results to unseen data can be significantly harder than applying to training data. In our work, we used completely different databases for training the system and for testing the performance.

The Corel image database, used also in the development of SIMPLIcity and ALIP, containing close to 60,000 general-purpose photographs is used to learn the statistical relationships between images and words. This database was categorized into 599 semantic concepts by Corel during image acquisition. Each concept, containing roughly 100 images, is described by several words, e.g., "landscape, mountain, ice, glacier, lake", "space, planet, star." A total of 332 distinct words are used for all the concepts. We created most of the descriptive words by browsing through images in every concept. A small portion of the words come from the category names given by the vendor. We used 80 images in each concept to build profiling models.

Image Signature

To form the signature of an image, two types of features are extracted: color and texture. To extract the color part of the signature, the RGB color components of each pixel are converted to the LUV color components. The 3-d color vectors at all the pixels are clustered by k-means. The number of clusters in k-means is determined dynamically by thresholding the average within cluster distances. Arranging the cluster labels of the pixels into an image according to the pixel positions, we obtain a segmentation of the image. We refer to the collection of pixels mapped to the same cluster as a region. For each region, its average color vector and the percentage of pixels it contains with respect to the whole image are computed. The color signature is thus formulated as a discrete distribution $\{(v^{(1)},p^{(1)}),(v^{(2)},p^{(2)}),\ldots,(v^{(m)},p^{(m)})\}$, where $v^{(j)}$ is the mean color vector, $p^{(j)}$ is the associated probability, and iii is the number of regions.

Figure 4:
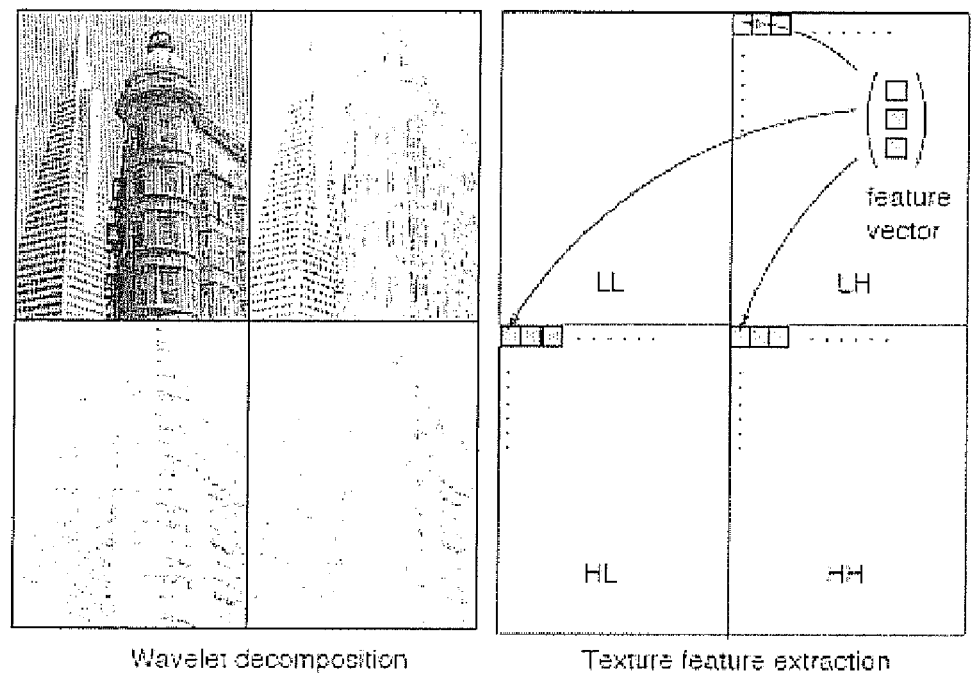
FIG. 4 shows the texture feature extraction by wavelet decomposition.

We use wavelet coefficients in high frequency bands to form texture features. A Daubechies 4 wavelet transform is applied to the L component (intensity) of each image. FIG. 4 shows the decomposition of an image into four frequency bands: LL, LH, BL, HH. The transform decomposes an image into four frequency bands: LL, LU, EL, RH. The LH, EL, and HH band wavelet coefficients corresponding to the same spatial position in the image are grouped into one 3-d texture feature vector. If an image contains $n_r \times n_c$ pixels, the total number of texture feature vectors is $n_r/2 \times n_c/2$ due to the sub-sampling of the wavelet transform. When forming the texture features, the absolute values of the wavelet coefficients are used, K-means clustering is applied to the texture feature vectors to extract the major modes of these vectors, Again, the number of clusters is decided adaptively by thresholding the average within cluster distances. Similarly as color, the texture signature is cast into a discrete distribution.

In general, let us denote images in the database by $\{\beta_1, \beta_2, \ldots, \beta_N\}$. Suppose every image is mathematically an array of discrete distributions, $\beta_i = (\beta_{i,1}, \beta_{i,2}, \ldots, \beta_{i,d})$. Denote the space of $\beta_{i,l}$ by $\Omega_l$, $\beta_{i,l} \in \Omega_l$, $l=1,2,\ldots,d$. Then the space of $\beta_i$ is the Cartesian product space $$\Omega = \Omega_1 \times \Omega_2 \times \ldots \times \Omega_d.$$

The dimension d of $\Omega$, i.e., the number of distributions contained in $\beta_i$, is referred to as the super-dimension to distinguish from the dimensions of vector spaces on which these distributions are defined. For a fixed super-dimension j, the distributions $\beta_{i,j}$, $i=1,\ldots,N$, are defined on the same vector space, $R^{d_j}$, where $d_j$ is the dimension of the jth sample space. Denote distribution $\beta_{i,j}$ by $$\beta_{i,j} = \{(v_{i,j}^{(1)}, p_{i,j}^{(1)}), (v_{i,j}^{(2)}, p_{i,j}^{(2)}), \ldots, (v_{i,j}^{(m_{i,j})}, p_{i,j}^{(m_{i,j})})\}, \quad (1)$$

where $v_{i,j}^{(k)} \in R^{d_j}$, $k=1,\ldots,m_{i,j}$, are vectors on which the distribution $\beta_{i,j}$ takes positive probability $p_{i,j}^{(k)}$. The cardinality of the support set for $\beta_{i,j}$ is $m_{i,j}$ which varies with both the image and the super-dimension.

To further clarify the notation, consider the following example. Suppose images are segmented into regions by clustering 3-dimensional color features and 3-dimensional texture features respectively. Suppose a region formed by segmentation with either type of features is characterized by the corresponding mean feature vector. For brevity, suppose the regions have equal weights. Since two sets of regions are obtained for each image, the super-dimension is d=2. Let the first super-dimension correspond to color based regions and the second to texture based regions. Suppose an image i has 4 color regions and 5 texture regions. Then $$\beta_{i,1} = \{(v_{i,1}^{(1)}, 14), (v_{i,1}^{(2)}, 14), \ldots, (v_{i,1}^{(4)}, 14)\}, v_{i,1}^{(k)} \in R^3;$$

$$\beta_{i,2} = \{(v_{i,2}^{(1)}, 15), (v_{i,2}^{(2)}, 15), \ldots, (v_{i,2}^{(5)}, 15)\}, v_{i,2}^{(5)} \in R^3.$$

A different image i' may have 6 color regions and 3 texture regions. In contrast to image i, for which $m_{i,1}=4$ and $m_{i,2}=5$, we now have $m_{i',1}=6$ and $m_{i',2}=3$. However, the sample space where $v_{i,1}^{(k)}$ and $v_{i',1}^{(k')}$ (or $v_{i,2}^{(k)}$ vs. $v_{i',2}^{(k')}$) reside is the same, specifically, $R^3$.

Existing methods of multivariate statistical modeling are not applicable to build models on $\Omega$ because $\Omega$ is not a Euclidean space. Lacking algebraic properties, we have to rely solely on a distance defined in $\Omega$. Consequently, we adopt a prototype modeling approach explained in subsequent sections.

Mallows Distance Between Distributions

To compute the distance $D(\gamma_1,\gamma_2)$ between two distributions $\gamma_1$ and $\gamma_2$, we use the Mallows distance introduced in 1972. Suppose random variable $X \in R^k$ follow the distribution $\gamma_1$ and $Y \in R^k$ follow $\gamma_2$. Let $Y(\gamma_1,\gamma_2)$ be the set of joint distributions over X and Y with marginal distributions of X and Y constrained to $\gamma_1$ and $\gamma_2$ respectively. Specifically, if $\zeta \in Y(\gamma_1, \gamma_2)$, then $\zeta$ has sample space $R^k \times R^k$ and its marginals $\zeta_X = \gamma_1$ and $\zeta_Y = \gamma_2$. The Mallows distance is defined as the minimum expected distance between X and Y optimized over all joint distributions $\zeta \in Y(\gamma_1,\gamma_2)$:

$$D(\gamma_1, \gamma_2) @ \min_{\zeta \in \Upsilon(\gamma_1,\gamma_2)} (EPX - YP^p)^{1/p}, \quad (2)$$

where P·P denotes the $L_p$ distance between two vectors. In our discussion, we use the $L_2$ distance, i.e., p=2. The Mallows distance is proven to be a true metric.

For discrete distributions, the optimization involved in computing the Mallows distance can be solved by linear programming. Let the two discrete distributions be $$\gamma_i = \{(z_i^{(1)}, q_i^{(1)}), (z_i^{(2)}, q_i^{(2)}), \ldots, (z_i^{(m_i)}, q_i^{(m_i)})\}, i=1,2.$$

Then Equation (2) is equivalent to the following optimization problem:

$$D^2(\gamma_1, \gamma_2) = \min_{\{w_{i,j}\}} \sum_{i=1}^{m_1} \sum_{j=1}^{m_2} w_{i,j} P z_1^{(i)} - z_2^{(j)} P^2 \quad (3)$$

subject to $$\sum_{j=1}^{m_2} w_{i,j} = q_1^{(i)}, i=1, \ldots, m_1; \quad (4)$$

$$\sum_{i=1}^{m_1} w_{i,j} = q_2^{(j)}, j=1, \ldots, m_2;$$

$$w_{i,j} \geq 0, i=1, \ldots, m_1, j=1, \ldots, m_2.$$

Figure 5:
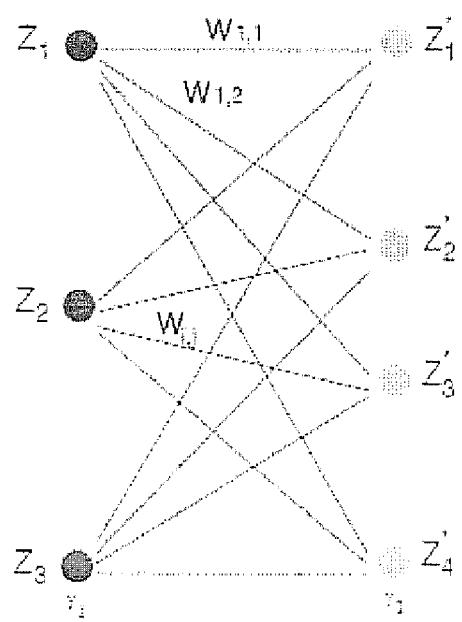
FIG. 5 shows matching for computing the Mallows distance.

The above optimization problem suggests that the squared Mallows distance is a weighted sum of pairwise squared $L_2$ distances between any support vector of $\gamma_1$ and any of $\gamma_2$. Hence, as shown in FIG. 5, computing the Mallows distance is essentially optimizing matching weights between support vectors in the two distributions so that the aggregated distance is minimized. The matching weights $w_{i,j}$ are restricted to be nonnegative and the weights emitting from any vector $z_i^{(j)}$ sum up to its probability $q_i^{(j)}$. Thus $q_i^{(j)}$ sets the amount of influence from $z_i^{(j)}$ on the overall distribution distance.

The optimization problem involved in computing the Mallows distance is the same as that for solving the mass transportation problem. A well-known image distance used in retrieval, namely the Earth Mover's Distance (EMD) is closely related to the Mallows distance. In fact, as discussed in, EMD is equivalent to the Mallows distance when the same total mass is assigned to both distributions.

Discrete Distribution (D2-) Clustering

Since elements in $\Omega$ each contain multiple discrete distributions, we measure their distances by the sum of squared Mallows distances between individual distributions. Denote the distance by $\tilde{D}(\beta_i,\beta_j)$, $\beta_i,\beta_j \in \Omega$, then $$\tilde{D}(\beta_i, \beta_j) @ \sum_{l=1}^{d} D^2(\beta_{i,l}, \beta_{j,l}).$$

Recall that d is the super-dimension of $\Omega$.

To determine a set of prototypes $A=\{\alpha_\eta : \alpha_\eta \in \Omega, \eta=1,\ldots,\overline{m}\}$ for an image set $B=\{\beta_i : \beta_i \in \Omega, i=1,\ldots,n\}$, we propose the following optimization criterion:

$$L(B, A'') = \min_A \sum_{i=1}^{n} \min_{\eta=1,\ldots,\overline{m}} \overline{D}(\beta_i, \alpha_\eta). \quad (5)$$

The objective function (5) entails that the optimal set of prototypes, A*, should minimize the sum of distances between images and their closest prototypes. This is a natural criterion to employ for clustering and is in the same spirit as the optimization criterion used by k-means. However, as $\Omega$ is more complicated than the Euclidean space and the Mallows distance itself requires optimization to compute, the optimization problem of Eq. (5) is substantially more difficult than that faced by k-means.

For the convenience of discussion, we introduce a prototype assignment function $c(i) \in \{1, 2, \ldots, \overline{m}\}$, for $i=1,\ldots,n$. Let $$L(B, A, c) = \sum_{i=1}^{n} \tilde{D}(\beta_i, \alpha_{c(i)}).$$

With A fixed, L(B,A,c) is minimized by $c(i)=_{\eta=1,\ldots,\overline{m}} \overline{D}(\beta_i, \alpha_\eta)$. Hence, $L(B,A^*)=\min_A \min_c L(B,A,c)$ according to ((5)). The optimization problem of ((5)) is thus equivalent to the following:

$$L(B, A^*, c^*) = \min_A \min_c \sum_{i=1}^{n} \tilde{D}(\beta_i, \alpha_{c(i)}). \quad (6)$$

To minimize L(B,A,c), we iterate the optimization of c given A and the optimization of A given c as follows. We assume that A and c are initialized. Tile initialization will be discussed later. >From clustering perspective, the partition of images to the prototypes and optimization of the prototypes are alternated.

1) For every image i, set $c(i)=_{\eta=1,\ldots,\overline{m}} \tilde{D}(\beta_i, \alpha_\eta)$.1

2) Let $C_\eta = \{i : c(i)=\eta\}$, $\eta=1,\ldots,\overline{m}$. That is, $C_\eta$ contains indices of images assigned to prototype $\eta$. For each prototype $\eta$, let $\alpha_\eta =_{\alpha \in \Omega} \Sigma_{i \in C_\eta} \tilde{D}(\beta_i, \alpha)$.2

The update of c(i) in Step 1 can be obtained by exhaustive search. The update of $\alpha_\eta$ cannot be achieved analytically and is the core of the algorithm. Use the notation $\alpha = (\alpha_{.,1}, \alpha_{.,2}, \ldots, \alpha_{.,d})$. Note that $$\alpha_\eta = \alpha \in \Omega \sum_{i \in C_\eta} \tilde{D}(\beta_i, \alpha) \qquad (7)$$

$$= \alpha \in \Omega \sum_{i \in C_\eta} \sum_{l=1}^{d} D^2(\beta_{i,l}, \alpha_{\cdot,l})$$

$$= \sum_{l=1}^{d} \sum_{\alpha_{\cdot,l} \in \Omega_l} \sum_{i \in C_\eta} D^2(\beta_{i,l}, \alpha_{\cdot,l})$$

Equation ((7)) indicates that each super-dimension $\alpha_{\eta,l}$ in $\alpha_\eta$ can be optimized separately. For brevity of notation and without loss of generality, let us consider the optimization of $\alpha_{\cdot,l}$. Also assume that $C_i=\{1,2,\ldots,n'\}$. Let $$\alpha_{\cdot,1}\{(z^{(1)},q^{(1)}),(z^{(2)},q^{(2)}),\ldots,(z^{(m)},q^{(m)})\},$$

where $$\sum_{k=1}^{m} q^{(m)} = 1, z^{(k)} \in R^{d_1}.$$

The number of vectors, m, can be preselected. If $\alpha_{\cdot,1}$ contains a smaller number of vectors than m, it can be considered as a special case with some $q^{(k)}$'s being zero. On the other hand, a large m requires more computation. The goal is to optimize over $z^{(k)}$ and $q^{(k)}$, k=1,...,m, so that $$\sum_{i=1}^{n'} D^2(\beta_{i,1}, \alpha_{\cdot,1})$$

is minimized. Recall the expansion of $\beta_{i,j}$ in ((1)). Applying the definition of the Mallows distance, we have $$\min_{\alpha_{\cdot,1} \in \Omega_1} \sum_{i=1}^{n'} D^2(\beta_{i,1}, \alpha_{\cdot,1}) = \min_{z^{(k)}, q^{(k)}} \sum_{i=1}^{n'} \min_{w_{k,j}^{(i)}} \sum_{k=1}^{m} \sum_{j=1}^{m_{i,1}} w_{k,j}^{(i)} P z^{(k)} - v_{i,1}^{(j)} P^2. \qquad (8)$$

The optimization is over $z^{(k)}$, $q^{(k)}$, k=1,...,m, and $w_{i,j}^{(i)}$, i=1,...,n', k=1,...,m, j=1,...,$m_{i,1}$. Probabilities $q^{(k)}$'s are not explicitly in the objective function, but they affect the optimization by posing as constraints. The constraints for the optimization are:

$$\sum_{k=1}^{m} q^{(k)} = 1 \bmod * 1.0 \text{ in}$$

$q^{(k)} \geq 0$, for any $k = 1, \ldots, m \bmod * 0.8$ in $$\sum_{j=1}^{m_{i,1}} w_{k,j}^{(i)} = q^{(k)}, \text{ for any } i = 1, \ldots, n', k = 1, \ldots, m$$

$$\sum_{k=1}^{m} w_{k,j}^{(i)} = p_{i,1}^{(j)}, \text{ for any } i = 1, \ldots, n', j = 1, \ldots, m_{i,1}$$

$w_{k,j}^{(i)} \geq 0$, for any $i = 1, \ldots, n', k = 1, \ldots, m, j = 1, \ldots, m_{i,1}$.

A key observation for solving the above optimization is that with fixed $z^{(k)}$, k=1,...,m, the objective function over $q^{(k)}$'s and $w_{k,j}^{(i)}$'s is linear and all the constraints are linear.

Hence, with $z^{(k)}$'s fixed, $q^{(k)}$, $w_{k,j}^{(i)}$ can be solved by linear programming. It is worthy to note the difference between this linear optimization and that involved in computing the Mallows distance. If $q^{(k)}$'s are known, the objective function in (8) is minimized simply by finding the Mallows distance matching weights between the prototype and each image. The minimization can be performed separately for every image. When $q^{(k)}$'s are part of the optimization variables, the Mallows distance matching weights $w_{k,j}^{(i)}$ have to be optimized simultaneously for all the images $i \in C_i$ because they affect each other through the constraint $$\sum_{j=1}^{m_{i,1}} w_{k,j}^{(i)} = q^{(k)},$$

for any i=1,...,n'.

When $q^{(k)}$'s and $w_{k,j}^{(i)}$'s are fixed, Equation (8) is simply a weighted sum of squares in terms of $z^{(k)}$'s and is minimized by the following formula:

$$z^{(k)} = \frac{\sum_{i=1}^{n'} \sum_{j=1}^{m_{i,1}} w_{k,j}^{(i)} v_{i,1}^{(j)}}{\sum_{i=1}^{n'} \sum_{j=1}^{m_{i,1}} w_{k,j}^{(i)}}, k = 1, \ldots, m. \qquad (9)$$

We now summarize the D2-clustering algorithm, assuming the prototypes are initialized.

1) For every image i, set $c(i) =_{\eta=1,\ldots,\overline{m}} \tilde{D}(\beta_i, \alpha_\eta)$.3

2) Let $C_\eta = \{i : c(i) = \eta\}$, $\eta=1,\ldots,\overline{m}$. Update each $\alpha_{\eta,l}$, $\eta=1,\ldots,\overline{m}$, l=1,...,d, individually by the following steps. Denote $$\alpha_{\eta,1} = \{(z_{\eta,l}^{(1)}, q_{\eta,l}^{(1)}), (z_{\eta,l}^{(2)}, q_{\eta,l}^{(2)}), \ldots, (z_{\eta,l}^{(m'_{\eta,l})}, q_{\eta,l}^{(m'_{\eta,l})})\}.$$

a) Fix $z_{\eta,l}^{(k)}$, k=1,...,$m_{\eta,l}'$. Update $q_{\eta,l}^{(k)}$, $w_{k,j}^{(i)}$, $i \in C_\eta$, k=1,...,$m_{\eta,l}'$, j=1,...,$m_{i,l}$ by solving the linear programming problem:

$$\min_{q_{\eta,1}^{(k)}} \sum_{i \in C_\eta} \min_{w_{k,j}^{(i)}} \sum_{k=1}^{m'_{\eta,l}} \sum_{j=1}^{m_{i,l}} w_{k,j}^{(i)} P z_{\eta,l}^{(k)} - v_{i,l}^{(j)} P^2,$$

subject to $$\sum_{k=1}^{m'_{\eta,l}} q_{\eta,1}^{(k)} = 1;$$

$q_{\eta,l}^{(k)} \geq 0$, k=1,...,$m_{\eta,l}'$;

$$\sum_{j=1}^{m_{i,l}} w_{k,j}^{(i)} = q_{\eta,1}^{(k)},$$

$i \in C_\eta$, k=1,...,$m_{\eta,l}'$;

$$\sum_{k=1}^{m'_{\eta,l}} w_{k,j}^{(i)} = p_{i,l}^{(j)},$$

$i \in C_\eta$, $j=1, \ldots, m_{,i}$; $w_{k,j}^{(i)} \geq 0$, $i \in C_\eta$, $k=1, \ldots, m_{\eta,l}'$, $j=1, \ldots, m_{i,l}$.4 b) Fix $q_{\eta,l}^{(k)}$, $w_{k,j}^{(i)}$, $i \in C_\eta$, $1 \leq k \leq m'_{\eta,l}$, $1 \leq j \leq m_{i,l}$. Update $z_{\eta,l}^{(k)}$, $k=1, \ldots, m'_{\eta,l}$ by $$z_{\eta,l}^{(k)} = \frac{\sum_{i \in C_\eta} \sum_{j=1}^{m_{j,l}} w_{k,j}^{(i)} v_{i,l}^{(j)}}{\sum_{i \in C_\eta} \sum_{j=1}^{m_{i,l}} w_{k,j}^{(i)}}.$$

c) Compute $$\sum_{i \in C_\eta} \sum_{k=1}^{m'_{\eta,l}} \sum_{j=1}^{m_{i,l}} w_{k,j}^{(i)} P z_{i,l}^{(j)} - v_{\eta,l}^{(j)} P^2.$$

If the rate of decrease from the previous iteration is below a threshold, go to Step 3; otherwise, go to Step 2a.

3) Compute L(B,A,c). If the rate of decrease from the previous iteration is below a threshold, stop; otherwise, go back to Step 1.

Figure 6:
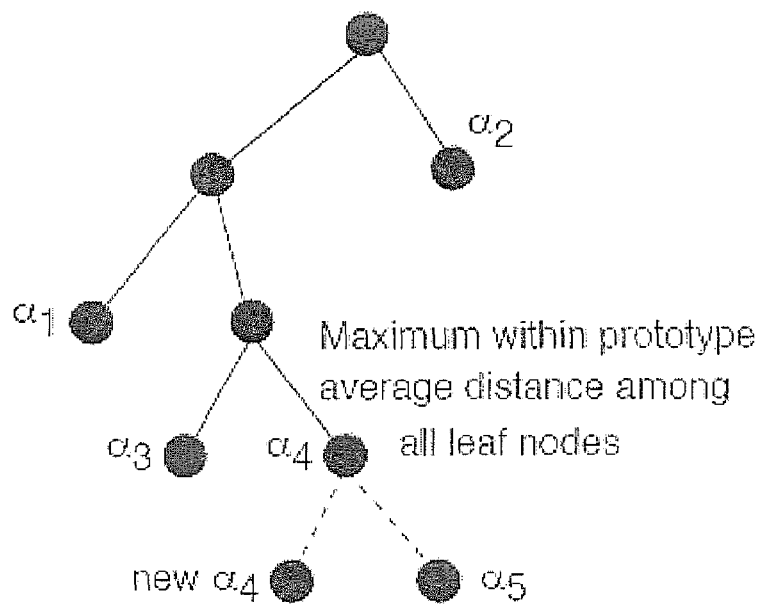
FIG. 6 shows a tree structured recursive split for initialization.

The initial prototypes are generated by tree structured recursive splitting. As shown in FIG. 6, suppose there are currently $\bar{m}'$ prototypes formed. For each prototype, the average $\tilde{D}$ distance between this prototype and all the images assigned to it is computed. The prototype with the maximum average distance is split to create the $\overline{m}'+1$st prototype. The split is conducted in the following way. Suppose the prototype to be split is $\alpha_\eta$, $1 \leq \eta \leq \bar{m}'$. An image assigned to $\alpha_\eta$ is randomly chosen, for instance, image $\beta_i$. Then we set $\alpha_{\overline{m}'+1} = \beta_i$. Note that $\alpha_\eta$ has already existed. We then treat the current value of $\alpha_\eta$ and $\alpha_{\overline{m}+1}$ as initial values, and optimize them by applying the D2-clustering only to images assigned to $\alpha_\eta$ at the beginning of the split. At the end of the D2-clustering, we have updated $\alpha_\eta$ and $\alpha_{\overline{m}'+1}$ and obtained a partition into the two prototypes for images originally in $\alpha_\eta$. The splitting procedure is recursively applied to the prototype currently with maximum average distance until the maximum average distance is below a threshold or the number of prototypes exceeds a given threshold. During initialization, the probabilities $q_{\eta,l}^{(k)}$ in each $\alpha_{\eta,l}$ are set uniform for simplicity. Therefore, in Step 2a of the above algorithm, optimization can be done only over the matching weights $w_{k,j}^{(i)}$, and $w_{k,j}^{(i)}$ can be computed separately for each image.

The number of prototypes $\bar{m}$ is determined adaptively for different concepts of images. Specifically, the value of $\bar{m}$ is increased gradually until the loss function is below a given threshold or $\bar{m}$ reaches an upper limit. In our experiment, the upper limit is set to 20, which ensures that on average, every prototype is associated with 4 training images. Concepts with higher diversity among images tend to require more prototypes. The histogram for the number of prototypes in each concept, shown in FIG. 7A, demonstrates the wide variation in the level of image diversity within one concept.

Mixture Modeling

With the prototypes determined, we employ a mixture modeling approach to construct a probability measure on $\Omega$. Every prototype is regarded as the centroid of a mixture component. When the context is clear, we may use component and cluster exchangeably because every mixture component is estimated using image signatures in one cluster. The likelihood of a signature under a given component reduces when the signature is further away from the corresponding prototype (i.e., component center).

Modeling via Hypothetical Local Mapping (HLM)

Figures 7A, 7B:
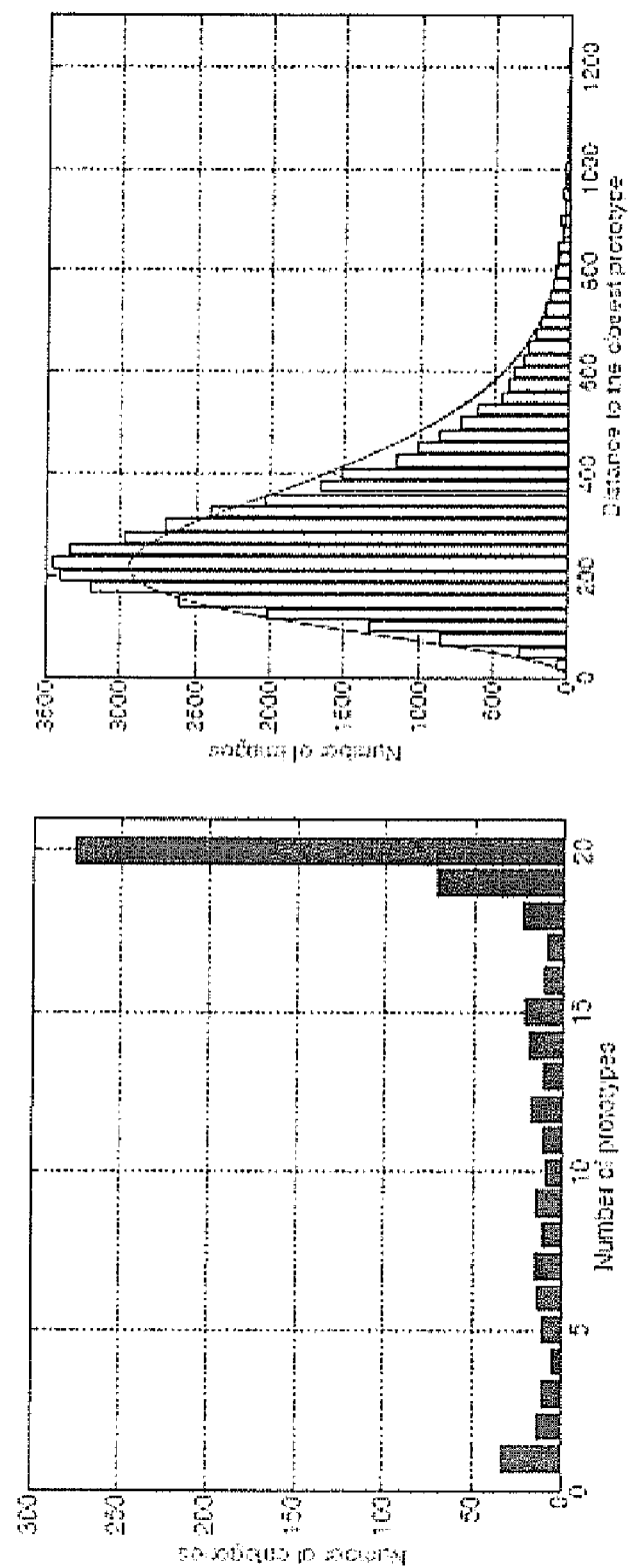
FIG. 7A shows statistical modeling results for a histogram of the number of prototypes in each class.
FIG. 7B shows statistical modeling results for fitting a Gamma distribution to the distance between an image and its closest prototype.

FIG. 7B shows the histogram of distances between images and their closest prototypes in one experiment. The curve overlaid on it is the probability density functions (pdf) of a fitted Gamma distribution. The pdf function is scaled so that it is at the same scale as the histogram. Denote a Gamma distribution by ($\gamma$:b,s), where b is the scale parameter and s is the shape parameter. The pdf of ($\gamma$:b,s) is:

$$f(u) = \frac{\left(\frac{u}{b}\right)^{s-1} e^{-u/b}}{b \Gamma(s)}, u \geq 0$$

where $\Gamma(\cdot)$ is the Gamma function.

Consider multivariate random vector $X=(X_1, X_2, \ldots, X_k)^t \in R^k$ that follows a normal distribution with mean $\mu=(\mu_1, \ldots, \mu_k)^t$ and a covariance matrix $\Sigma = \sigma^2 I$, where I is the identity matrix. Then the squared Euclidean distance between X and the mean $\mu$, $PX-\mu P^2$, follows a Gamma distribution $$\left(\gamma : \frac{k}{2}, 2\sigma^2\right).$$

Based on this fact, we assume that the neighborhood around each prototype in $\Omega$, that is, the cluster associated with this prototype, can be locally approximated by $R^k$, where $k=2s$ and $\sigma^2 = b/2$. Here, approximation means there is a one to one mapping between points in $\Omega$ and in $R^k$ that maximumly preserves all the pairwise distances between the points. The parameters s and b are estimated from the distances between images and their closest prototypes. In the local hypothetical space $R^k$, images belonging to a given prototype are assumed to be generated by a multivariate normal distribution, the mean vector of which is the map of the prototype in $R^k$. The pdf for a multivariate normal distribution $N(\mu, \sigma^2 I)$ is:

$$\varphi(x) = \left(\frac{1}{\sqrt{2\pi\sigma^2}}\right)^k e^{\frac{Px-\mu P^2}{2\sigma^2}}.$$

Formulating the component distribution back in $\Omega$, we note that $Px-\mu P^2$ is correspondingly the $\tilde{D}$ distance between an image and its prototype. Let the prototype be $\alpha$ and the image be $\beta$. Also express k and $\sigma^2$ in terms of the Gamma distribution parameters b and s. The component distribution around $\alpha$ is.

$$g(\beta) = \left(\frac{1}{\sqrt{\pi b}}\right)^{2s} e^{\frac{\tilde{D}(\beta,\alpha)}{b}}.$$

For an m component mixture model in $\Omega$ with prototypes $\{\alpha_1, \alpha_2, \ldots, \alpha_m\}$, let the prior probabilities for the components be $\omega_\eta$, $\eta=1, \ldots, m$, $$\sum_{\eta=1}^{m} \omega_\eta = 1.$$

The overall model for $\Omega$ is then:

$$\phi(\beta) = \sum_{\eta=1}^{m} \omega_\eta \left(\frac{1}{\sqrt{\pi b}}\right)^{2s} e^{-\frac{\tilde{D}(\beta,\alpha_\eta)}{b}}. \quad (10)$$

The prior probabilities $\omega_\eta$ can be estimated by the percentage of images partitioned into prototype $\alpha_\eta$, i.e., for which $\alpha_\eta$ is their closest prototype.

Mixture modeling via hypothetical local mapping for space $\Omega$. (a) Local mapping of clusters generated by D2-clustering in $\Omega$. (b) Bypassing mapping in model estimation.

Figure 8:
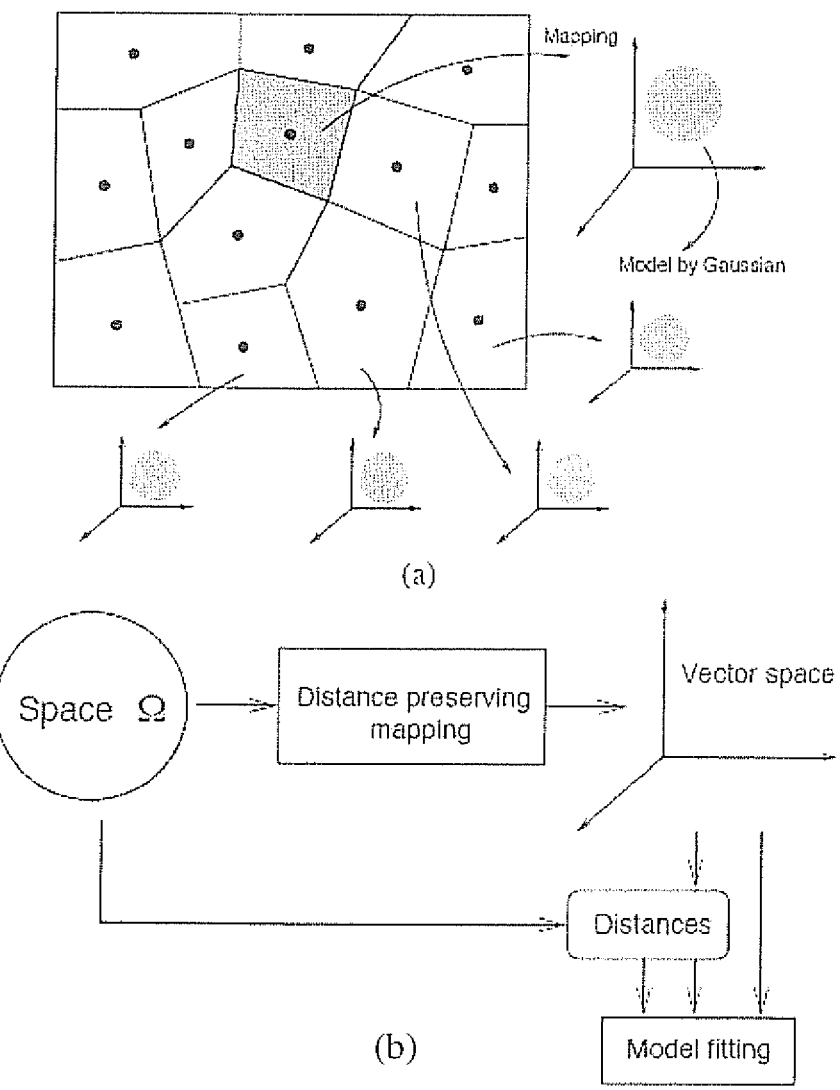
FIG. 8A shows mixture modeling via hypothetical local mapping for clusters generated by D2-clustering in $\Omega$.
FIG. 8B shows mapping in model estimation.

We call the above mixture modeling approach the hypothetical local mapping (HLM) method. In a nutshell, as illustrated in FIG. 5A, the metric space $\Omega$ is carved into cells via D2-clustering. Each cell is a neighborhood (or cluster) around its center, i.e., the prototype. Locally, every cluster is mapped to a Euclidean space that preserves pairwise distances. In the mapped space, data are modeled by a Gaussian distribution. It is assumed that the mapped spaces of the cells have the same dimensionality but possibly different variances. Due to the relationship between the Gaussian and Gamma distributions, parameters of the Gaussian distributions and the dimension of the mapped spaces can be estimated using only distances between each data point and its corresponding prototype. This implies that the actual mapping into $R^k$ is unnecessary because the original distances between images and their corresponding prototypes, preserved in mapping, can be used directly. This argument is also illustrated in FIG. 8B. The local mapping from $\Omega$ to $R^k$ is thus hypothetical and serves merely as a conceptual tool for constructing a probability measure on $\Omega$.

Mixture modeling is effective for capturing the nonhomogeneity of data, and is a widely embraced method for classification and clustering. The main difficulty encountered here is the unusual nature of space $\Omega$. Our approach is inspired by the intrinsic connection between k-means clustering and mixture modeling. It is known that under certain constraints on the parameters of component distributions, the classification EM (CEM) algorithm used to estimate a mixture model is essentially the k-means algorithm. We thus generalize k-means to D2-clustering and form a mixture model based on clustering. This way of constructing a mixture model allows us to capture the clustering structure of images in the original space of $\Omega$. Furthermore, the method is computationally efficient because the local mapping of clusters can be bypassed in calculation.

Parameter Estimation

Next, we discuss the estimation of the Gamma distribution parameters b and s. Let the set of distances be $\{u_1, u_2, \ldots, u_N\}$. Denote the mean $$\bar{u} = \frac{1}{N}\sum_{i=1}^{N} u_i.$$

The maximum likelihood (ML) estimators $\hat{b}$ and $\hat{s}$ are solutions of the equations:

$$\begin{cases} \log \hat{s} - \psi(\hat{s}) = \log\left[\bar{u} \Big/ \left(\prod_{i=1}^{N} u_i\right)^{1/N}\right] \\ \hat{b} = \bar{u}/\hat{s} \end{cases}$$

where $\psi(\cdot)$ is the di-gamma function:

$$\psi(s) = \frac{d\log\Gamma(s)}{ds}, s > 0.$$

The above set of equations are solved by numerical methods. Because $2s=k$ and the dimension of the hypothetical space, k, needs to be an integer, we adjust the ML estimation $\hat{s}$ to $s^* = \lfloor 2\hat{s}+0.5 \rfloor/2$, where $\lfloor \cdot \rfloor$ is the floor function. The ML estimation for b with $s^*$ given is $b^* = \bar{u}/s^*$. As an example, we show the histogram of the distances obtained from the training images and the fitted Gamma distribution with parameter ($\gamma$:3.5,86.34) in FIG. 7B.

In our system, we assume that the shape parameter s of all the mixture components in all the image concept classes is common while the scale parameter b varies with each component. That is, the clusters around every prototype are mapped hypothetically to the same dimensional Euclidean space, but the spreadness of the distribution in the mapped space varies with the clusters. Suppose the total number of prototypes is $\overline{M} = \Sigma_k M_k$, where $M_k$ is the number of prototypes for the k th image category, $k=1,2,\ldots,M$. Let $C_j$, $j=1,\ldots,\overline{M}$, be the index set of images assigned to prototype j. Note that the assignment of images to prototypes is conducted separately for every image class because D2-clustering is applied individually to every class, and the assignment naturally results from clustering. Let the mean of the distances in cluster j be $$\bar{u}_j = \frac{1}{|C_j|}\sum_{i\in C_j} u_j.$$

It is proved in Appendix A that the maximum likelihood estimation for s and $b_j$, $j=1,\ldots,\overline{M}$ is solved by the following equations:

$$\begin{cases} \log \hat{s} - \psi(\hat{s}) = \log\left[\prod_{j=1}^{M} \bar{u}_j^{|c_j|/N} \Big/ \left(\prod_{i=1}^{N} u_i\right)^{1/N}\right] \\ \hat{b}_j = \bar{u}_j/\hat{s}, j = 1, 2, \ldots, \overline{M} \end{cases} \quad (11)$$

Figure 7D:
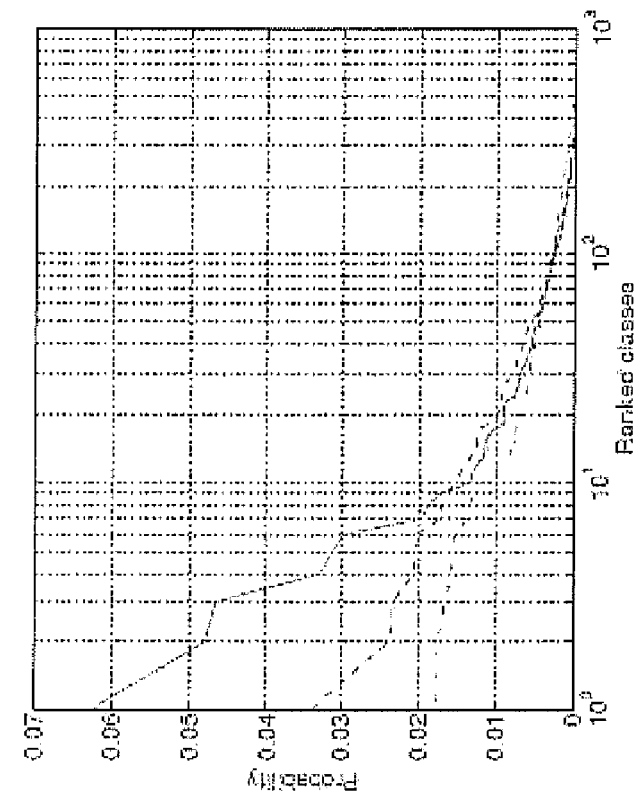
FIG. 7D shows statistical modeling results for the ranked concept posterior probabilities for three example images.
Figure 7C:
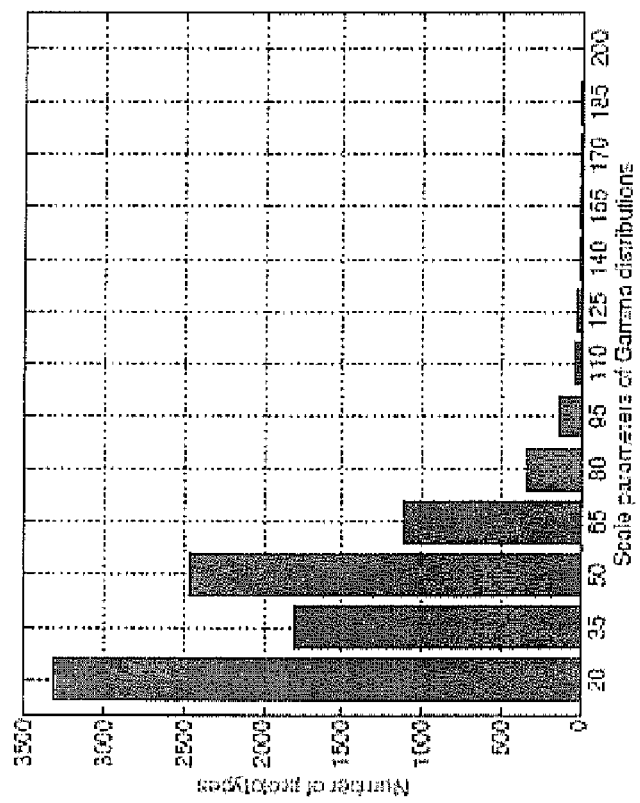
FIG. 7C shows statistical modeling results for a histogram of the scale parameters of the Gamma distributions for all the prototypes formed from the training data.

The above equation assumes that $u_i > 0$ for every i. Theoretically, this is true with probability one. In practice, however, due to limited data, we may obtain clusters containing a single image, and hence some $u_i$'s are zero. We resolve this issue by discarding distances acquired from clusters including only one image. In addition, we modify $\hat{b}_j = \bar{u}_j/\hat{s}$ slightly to $$\hat{b}_j = \lambda \frac{\bar{u}_j}{\hat{s}} + (1-\lambda)\frac{\bar{u}}{\hat{s}},$$

where $\lambda$ is a shrinkage factor that shrinks $\hat{b}_j$ toward a common value. We set $$\lambda = \frac{|C_j|}{|C_j|+1},$$

which approaches 1 when the cluster size is large. The shrinkage estimator is intended to increase robustness against small sample size for small clusters. It also ensures positive $\hat{b}_j$ even for clusters containing a single image. By this estimation method, we obtain s=5.5 for the training image set. FIG. 7C shows the histogram of the scale parameters, $b_j$'s, estimated for all the mixture components.

In summary, the modeling process comprises the following steps:

1) For each image category, optimize a set of prototypes by D2-clustering, partition images into these prototypes, and compute the distance between every image and the prototype it belongs to.

2) Collect the distances in all the image categories and record the prototype each distance is associated with. Estimate the common shape parameter s for all the Gamma distributions and then estimate the scale parameter $b_j$ for each prototype j.

3) Construct a mixture model for every image category using Equation ((10)). Specifically, suppose among all the $\overline{M}$ prototypes, prototypes $\{1,2,\ldots,M_1\}$ belong to category 1, and prototypes in $F_k=\{\overline{M}_{k-1}+1, \overline{M}_{k-1}+2, \ldots, \overline{M}_{k-1}+M_k\}$, $\overline{M}_{k-1}=M_1+M_2+\ldots M_{k-1}$, belong to category k, k>1. Then the profiling model $M_k$ for the kth image category has distribution:

$$\phi(\beta|M_k) = \sum_{\eta \in F_k} \omega_\eta \left(\frac{1}{\sqrt{\pi b_\eta}}\right)^{2s} e^{\frac{\tilde{D}(\beta,\alpha_\eta)}{b_\eta}},$$

where the prior $\omega_\eta$ is the empirical frequency of component $\eta$, $$\omega_\eta = |C_\eta| / \sum_{\eta' \in F_k} |C_{\eta'}|,$$

$\eta \in F_k$.

Annotation

Let the set of distinct annotation words for the M concepts be $W=\{w_1, w_2, \ldots, w_K\}$. In the experiment with the Corel database as training data, K=332. Denote the set of concepts that contain word $w_1$ in their annotations by $E(w_i)$. For instance, the word 'castle' is among the description of concept 160, 404, and 405. Then E(castle)=\{160,404,405\}.

To annotate an image, its signature $\beta$ is extracted first. We then compute the probability for the image being in each concept m:

$$p_m(s) = \frac{\rho_m \phi(s|M_m)}{\sum_{l=1}^{M} \rho_l \phi(s|M_l)}, m=1,2,\ldots,M,$$

where $\rho_m$ are the prior probabilities for the concepts and are set uniform. The probability for each word $w_i$, i=1,...,K, to be associated with the image is $$q(\beta, w_i) = \sum_{m: m \in E(w_i)} p_m(s).$$

We then sort $\{q(\beta,w_1), q(\beta,w_2), \ldots, q(\beta,w_K)\}$ in descending order and select top ranked words. FIG. 7D shows the sorted posterior probabilities of the 599 semantic concepts given each of three example images. The posterior probability decreases slowly across the concepts, suggesting that the most likely concept for each image is not strongly favored over the others. It is therefore important to quantify the posterior probabilities rather than simply classifying an image into one concept.

The main computational cost in annotation comes from calculating the Mallows distances between the query and every prototype of all the categories. The linear programming involved in Mallows distance is more computationally costly than some other matching based distances. For instance, the IRM region-based image distance employed by the SIMPLIcity system is obtained by assigning matching weights according to the "most similar highest priority (MSHP)" principle. By the MSHP principle, pairwise distances between two vectors across two discrete distributions are sorted. The minimum pairwise distance is assigned with the maximum possible weight, constrained only by conditions in (4). Then among the rest pairwise distances that can possibly be assigned with a positive weight, the minimum distance is chosen and assigned with the maximum allowed weight. So on so forth. From the mere perspective of visual similarity, there is no clear preference to either the optimization used in the Mallows distance or the MSHP principle. However, for the purpose of semantics classification, as the D2-clustering relies on the Mallows distance and it is mathematically difficult to optimize a clustering criterion similar to that in (5) based on MSHP, the Mallows distance is preferred. Leveraging advantages of both distances, we develop a screening strategy to reduce computation.

Because weights used in MSHP also satisfy conditions (4), the MSHP distance is always greater or equal to the Mallows distance. Since MSHP favors the matching of small pairwise distances in a greedy manner, it can be regarded as a fast approximation to the Mallows distance. Let the query image be $\beta$. We first compute the MSHP distance between $\beta$ and every prototype $\alpha_\eta$, $D_s(\beta,\alpha_\eta)$, $\eta=1,\ldots,\overline{M}$, as a substitute for the Mallows. These surrogate distances are sorted in ascending order. For the M' prototypes with the smallest distances, their Mallows distances from the query are then computed and used to replace the approximated distance by MSHP. The number of prototypes for which the Mallows distance is computed can be a fraction of the total number of prototypes, hence leading to significant reduction of computation. In our experiment, we set M'=1000 while $\overline{M}$=9265.

Experimental Results

We present in this section annotation results and performance evaluation of the ALIPR system. Three cases are studied: a) annotating images not included in the training set but within the Corel database; b) annotating images outside the Corel database and checking the correctness of annotation words manually by a dedicated examiner; c) annotating images uploaded by arbitrary online users of the system with annotation words checked by the users.

The first case evaluation avoids the arduous task of manual examination of words and hence is conducted on a larger set of images than in the second case. Performance achieved in this case is however optimistic because the Corel images are known to be highly clustered, that is, images in the same category are sometimes extraordinarily alike. In the real-world, annotating images with the same semantics can be harder due to the lack of such high visual similarity. This optimism is address by a "self-masking" evaluation scheme to be explained. Another limitation is that annotation words are assigned on a category basis for the Corel database. The words for a whole category are taken as ground truth for the annotation of every image in this category, which may not be complete for the particular image. To address these issues, in the second case, we experiment with general-purpose photographs acquired completely unrelatedly to Corel. Annotation words are manually checked for correctness on the basis of individual images. This evaluation process is labor intensive, taking several months to accomplish in our study. The third case evaluation best reflects users impression of the annotation system. It is inevitably biased by whoever use the online system. As will be discussed, the evaluation tends to be stringent.

Recall that the Corel database comprises 599 image categories, each containing 100 images, 80 of which are used for training. The training process takes an average of 109 seconds CPU time, with a standard deviation of 145 seconds on a 2.4 GHz AND processor.

Performance on Corel Images

For each of the 599 image categories in Corel, we test on the 20 images not included in training. As mentioned previously, the "true" annotation of every image is taken as the words assigned to its category. An annotation word provided by ALIPR is labeled correct if it appears in the given annotation, wrong otherwise. There are a total of 417 distinct words used to annotate Corel images. Fewer words are used in the online ALIPR system because location names are removed.

We compare the results of ALIPR with a nonparametric approach to modeling. Without D2-clustering and the estimation of the Gamma distribution, we form a kernel density estimate for each category, treating every image signature as a prototype. Suppose the training image signatures are $\{\beta_1, \beta_2, \ldots, \beta_N\}$. The number of images in class k is $n_k$, $$\sum_{k=1}^{599} n_k = N.$$

Without loss of generality, assume $\{\beta_{\bar{n}_k+1}, \ldots, \beta_{\bar{n}_k+n_k}\}$ belong to class k, where $\bar{n}_1 = 0$, $$\bar{n}_k = \sum_{k'=1}^{k-1} n_{k'},$$

for k>1. Under the nonparametric approach, the profiling model for each image category is $$\phi(\beta \mid M_k) = \sum_{i=\bar{n}_k+1}^{\bar{n}_k+n_k} \frac{1}{n_k} \left(\frac{1}{\sqrt{\pi b}}\right)^{2s} e^{\frac{D(\beta,\beta_i)}{b}}.$$

In the kernel function, we adopt the shape parameter s=5.5 since this is the value estimated using D2-clustering. When D2-clustering is applied, some clusters contain a single image. For these clusters, the scale parameter b=25.1. In the nonparametric setting, since every image is treated as a prototype that contains only itself, we experiment with b=0 and b=30, two values representing a range around 25.1. For brevity, we refer to the nonparametric approach as NP.

The NP approach is computationally more intensive during annotation than ALIPR because in ALIPR, we only need distances between a test image and each prototype, while the NP approach requires distances to every training image. We also expect ALIPR to be more robust for images outside Corel because of the smoothing across images introduced by D2-clustering, which will demonstrated by our results.

We assess performance using both precision and recall. Suppose the number of words provided by the annotation system is $n_s$, the number of words in the ground truth annotation is $n_t$, and the number of overlapped words between the two sets is $n_c$ (i.e., number of correct words). Precision is defined as $$\frac{n_c}{n_s},$$

and recall is $$\frac{n_c}{n_t}.$$

Figure 9B:
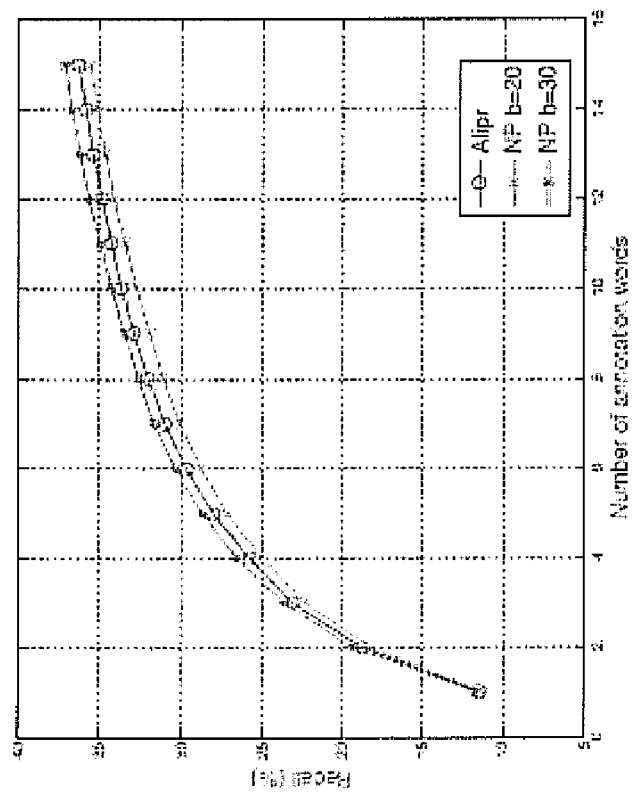
FIG. 9B shows a chart comparing annotation results of ALIPR and NP using test images in the Corel database for recall.
Figure 9A:
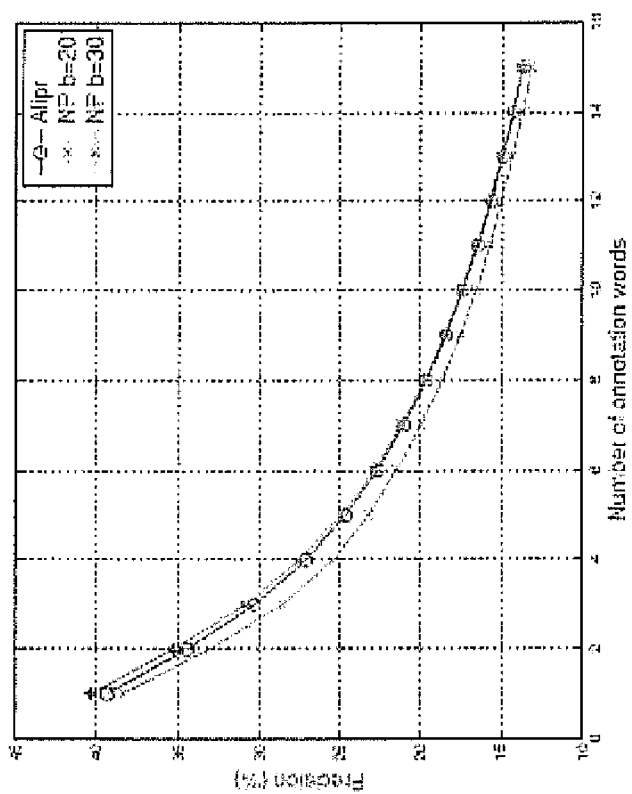
FIG. 9A shows a chart comparing annotation results of ALIPR and NP using test images in the Corel database for precision.

There is usually a tradeoff between precision and recall. When $n_s$ increases, recall is ensured to increase, while precision usually decreases because words provided earlier by the system have higher estimated probabilities of occurring. FIGS. 9A and 9B compare the results of ALIPR and NP in terms of precision and recall respectively. Both precision and recall are shown with $n_s$ increasing from 1 to 15. The precision of ALIPR and NP with b=30 is nearly the same, and the recall of NP with b=30 is slightly better. As discussed previously, without cautious measures, using Corel images in test tends to generate optimistic results. Although the NP approach is favorable within Corel, it may have overfit this image set. Because it is extremely labor intensive to manually check the annotation results of both ALIPR and NP on a large number of test images outside Corel, we design the self-masking scheme of evaluation to counter the highly clustered nature of Corel images.

In self-masking evaluation, when annotating an image in category k with signature β, we temporarily assume class k is not trained and compute the probabilities of the image belonging to every other class m, m≠k:

$$p_m(\beta) = \frac{\rho_m \phi(\beta \mid M_m)}{\sum_{m' \neq k} \rho_{m'} \phi(\beta \mid M_{m'})},$$

$$m = 1, 2, \ldots, k-1, k+1, \ldots, M.$$

Figure 9D:
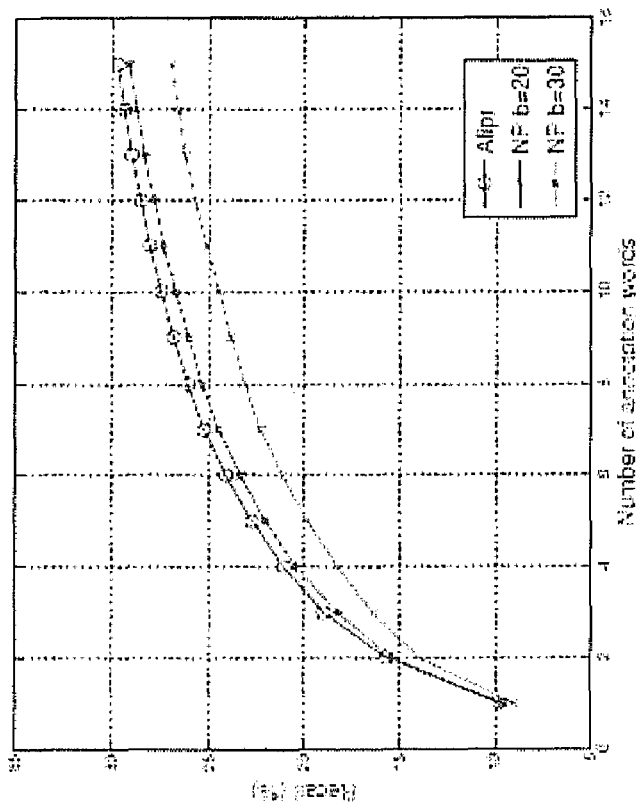
FIG. 9D shows a chart comparing annotation results of ALIPR and NP using test images in the Corel database for recall obtained by the self-masking evaluation scheme.
Figure 9C:
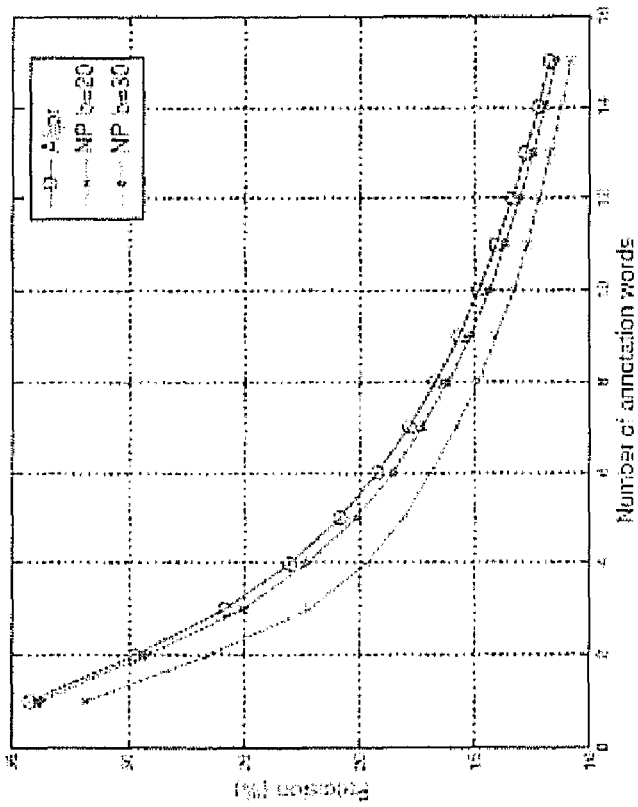
FIG. 9C shows a chart comparing annotation results of ALIPR and NP using test images in the Corel database for precision obtained by the self-masking evaluation scheme.

For class k, we set $p_k(\beta)=0$. With these modified class probabilities, words are selected using the same procedure described in Section V. Because image classes share annotation words, a test image may still be annotated with some correct words although it cannot be assigned to its own class. This evaluation scheme forces Corel images not to benefit from highly similar training images in their own classes, and better reflects the generalization capability of an annotation system. On the other hand, the evaluation may be negatively biased for some images. For instance, if an annotation word is used only for a unique class, the word becomes effectively "inaccessible" in this evaluation scheme. Precision and recall for ALIPR and NP under the self-masking scheme are provided in FIGS. 9C and 9D. ALIPR outperforms NP for both precision and recall consistently over all $n_s$ ranging from 1 to 15. This demonstrates that ALIPR can potentially perform better on images outside Corel.

An important feature of ALIPR is that it estimates probabilities for the annotation words in addition to ranking them. In the previous experiments, a fixed number of words is provided for all the images. We can also select words by thresholding their probabilities. In this case, images may be annotated with different numbers of words depending on the levels of confidence estimated for the words. Certain images not alike to any trained category may be assigned with no word due to low word probabilities all through. A potential usage of the thresholding method is to filter out such images and to achieve higher accuracy for the rest. Discarding a portion of images from a collection may not be a concern in some applications, especially in the current era of powerful digital imaging technologies, when we are often overwhelmed with the amount of images.

Figure 9F:
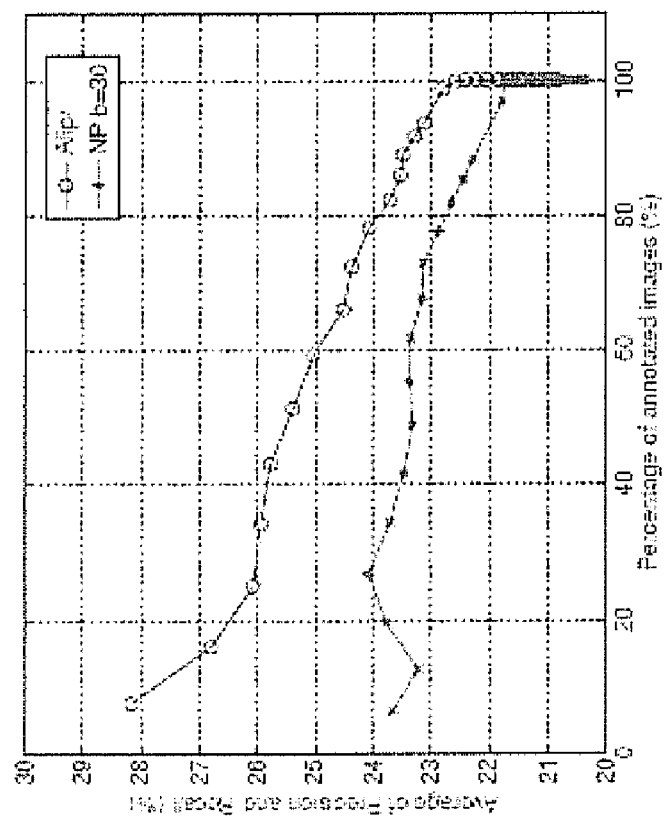
FIG. 9F shows a chart comparing annotation results of ALIPR and NP using test images in the Corel database for the average of precision and recall with self-masking, achieved by threshold word probabilities.
Figure 9E:
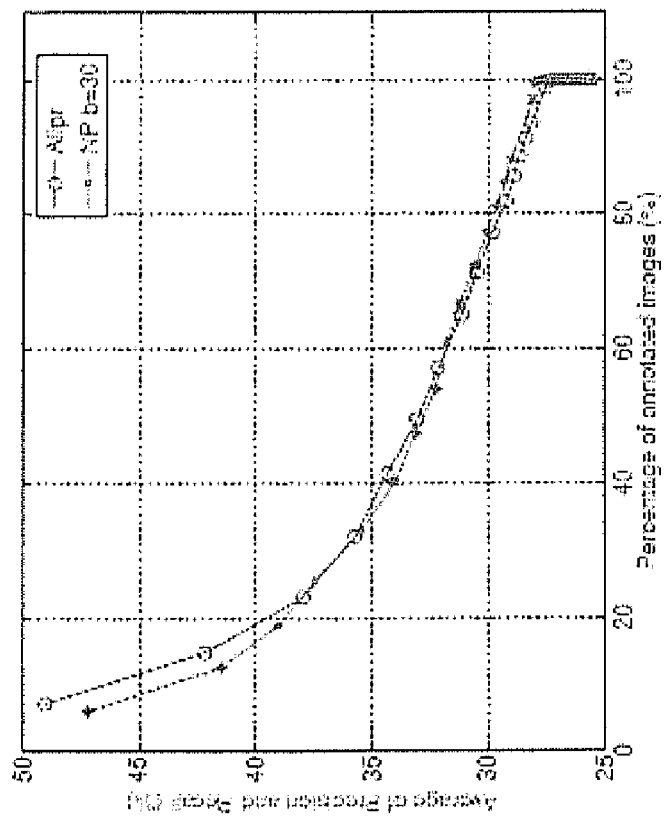
FIG. 9E shows a chart comparing annotation results of ALIPR and NP using test images in the Corel database for average of precision and recall without self-masking, achieved by thresholding word probabilities.
Figure 11A:
FIG. 11A shows unsuccessful cases of automatic annotation, specifically an object with an unusual background.
Figure 11B:
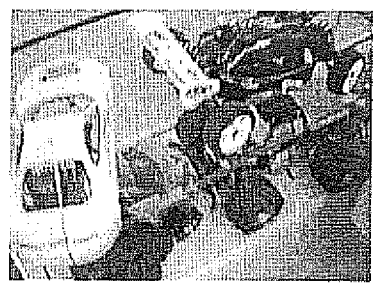
FIG. 11B shows unsuccessful cases of automatic annotation, specifically a fuzzy shot.
Figure 11C:
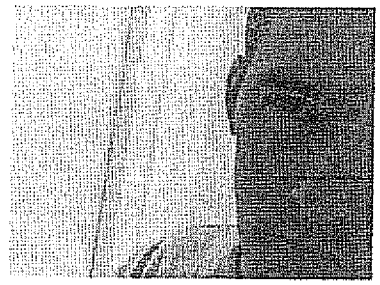
FIG. 11C shows unsuccessful cases of automatic annotation, specifically a partial object, wrong white balance.
Figure 11D:
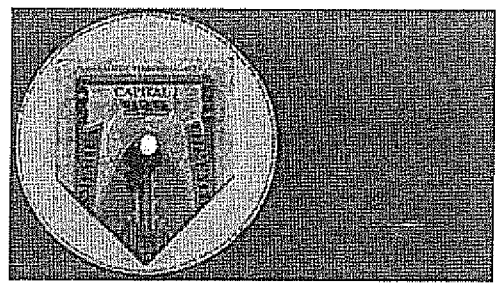
FIG. 11D shows unsuccessful cases of automatic annotation, specifically an unlearned object or concept.

FIGS. 9E and 9F show the performance achieved by thresholding without and with self-masking respectively. For brevity of presentation, instead of showing precision and recall separately, the mean value of precision and recall is shown. When the threshold for probability decreases, the percentage of images assigned with at least one annotation word, denoted by $p_a$, increases. The average of precision and recall is plotted against $p_a$. When $p_a$ is small, that is, when more stringent filtering is applied, annotation performance is in general better. In FIG. 9E, without self-masking, ALIPR and NP with b=30 perform closely, with ALIPR slightly better at the low end of $p_a$. Results for NP with b=20, worse than with b=30, are omitted for clarity of the plots. In FIG. 9F, with self-masking, ALIPR performs substantially better than NP. The gap between performance is more prominent at the low end of $p_a$.

Performance on Images Outside the Corel Database

To assess the annotation results for images outside the Corel database, we applied ALIPR to more than 54,700 images created by users of flickr.com and provide the results at the Website; alipr.com. This site also hosts the ALIPR demonstration system that performs real-time annotation for any image either uploaded directly by the user or downloaded from a user-specified URL. Annotation words for 12 images downloaded from the Internet are obtained by the online system and are displayed in FIG. 10. Six of the images are photographs and the others are digitized impressionism paintings. For these example images, it takes a 3.0 GHz Intel processor an average of 1.4 seconds to convert each from the JPEG to raw format, abstract the image into a signature, and find the annotation words.

It is not easy to find completely failed examples. However, we picked some unsuccessful examples, as shown in FIGS. 11A-11D. In general, the computer does poorly (a) when the way an object is taken in the picture is very different from those in the training, (b) when the picture is fuzzy or of extremely low resolution or low contrast, (c) if the object is shown partially, (d) if the white balance is significantly off, and (e) if the object or the concept has not been learned.

To numerically assess the annotation system, we manually examined the annotation results for 5,411 digital photos deposited by random users at flickr.com. Although several prototype annotation systems have been developed previously, a quantitative study on how accurate a computer can annotate images in the real-world has never been conducted. The existing assessment of annotation accuracy is limited in two ways. First, because the computation of accuracy requires human judgment on the appropriateness of each annotation word for each image, the enormous amount of manual work has prevented researchers from calculating accuracy directly and precisely. Lower bounds and various heuristics are used as substitutes. Second, test images and training images are from the same benchmark database. Because many images in the database are highly similar to each other, it is unclear whether the models established are equally effective for general images. Our evaluation experiments, designed in a realistic manner, will shed light on the level of intelligence a computer can achieve for describing images.

A Web-based evaluation system is developed to record human decision on the appropriateness of each annotation word provided by the system. Each image is shown together with 15 computer-assigned words in a browser. A trained person, who did not participate in the development of the training database or the system itself, examines every word against the image and checks a word if it is judged as correct. For words that are object names, they are considered correct if the corresponding objects appear in an image. For more abstract concepts, e.g., 'city' and 'sport', a word is correct if the image is relevant to the concept. For instance, 'sport' is appropriate for a picture showing a polo game or golf, but not for a picture of dogs. Manual assessment is collected for 5,411 images at flickr.com.

Figure 12A:
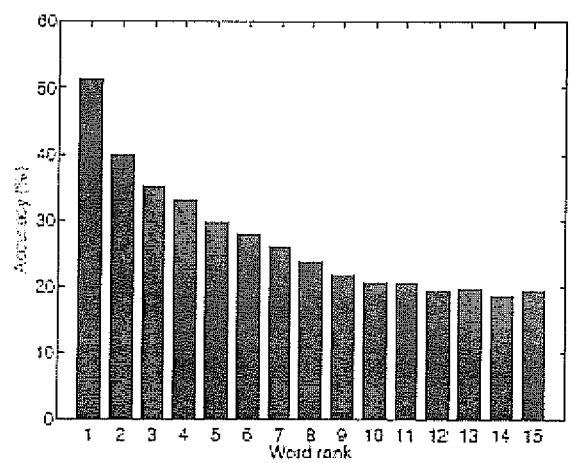
FIG. 12A is a chart showing percentages of images correctly annotated by the nth word.
Figure 12B:
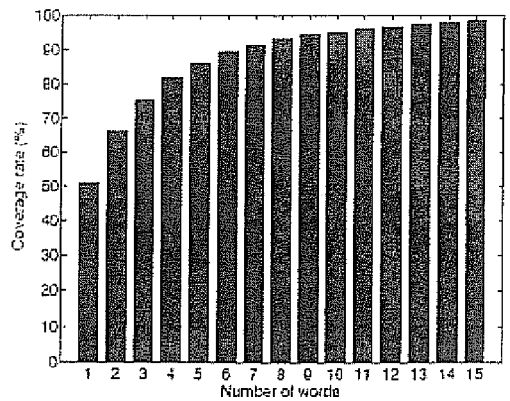
FIG. 12B is a chart showing percentages of images correctly annotated by at least one word among the top ii words.
Figure 12C:
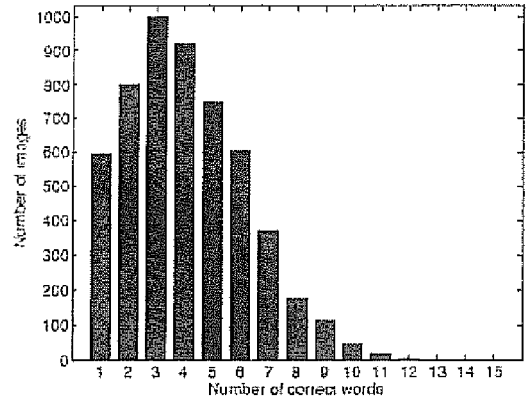
FIG. 12C is a histogram of the numbers of correct annotation words for each image among the top 15 words assigned to it.

Annotation performance is reported from several aspects in FIG. 12. Each image is assigned with 15 words listed in the descending order of the likelihood of being relevant. FIG. 12A shows the accuracies, that is, the percentages of images correctly annotated by the n th annotation word, n=1,2, ... ,15. The first word achieves an accuracy of 51.17%. The accuracy decreases gradually with n except for minor fluctuation with the last three words. This reflects that the ranking of the words by the system is on average consistent with the true level of accuracy. FIG. 12B shows the coverage rate versus the number of annotation words used. Here, coverage rate is defined as the percentage of images that are correctly annotated by at least one word among a given number of words. To achieve 80% coverage, we only need to use the top 4 annotation words. The top 7 and top 15 words achieve respectively a coverage rate of 91.37% and 98.13%. The histogram of the numbers of correct annotation words among the top 15 words is provided in FIG. 12C. On average, 4.1 words are correct for each image.

Performance Based on ALIPR Users

Figure 13A:
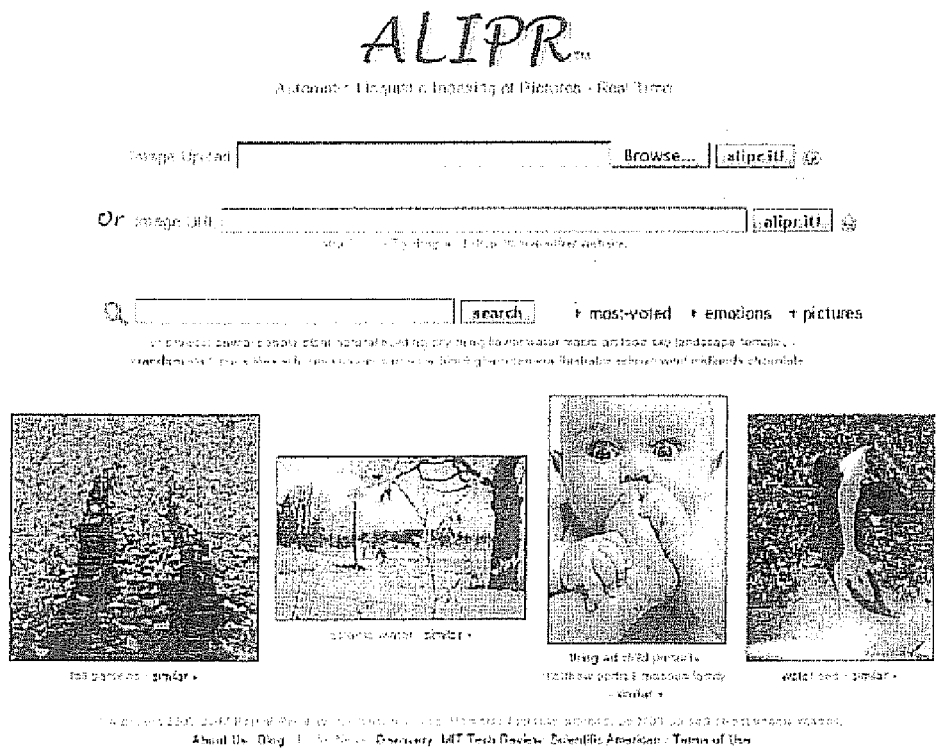
FIG. 13A shows the ALIPR web-based demonstration site showing the image uploading process.
Figure 13B:
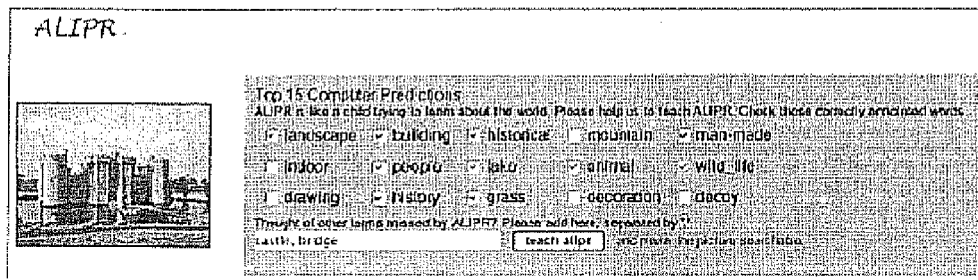
FIG. 13B shows the ALIPR web-based demonstration site showing annotation tags suggested.

The alipr.com Website allows users to upload their own pictures, or specify an image URL, and acquire annotation in real time. The Web interface is shown in FIG. 13A. Every word has a check box preceding it. Upon uploading an image, the user can click the check box if he or she regards the ALIPR-predicted word as correct and can also enter new annotation words in the provided text box (FIG. 13B).

Figure 14A:
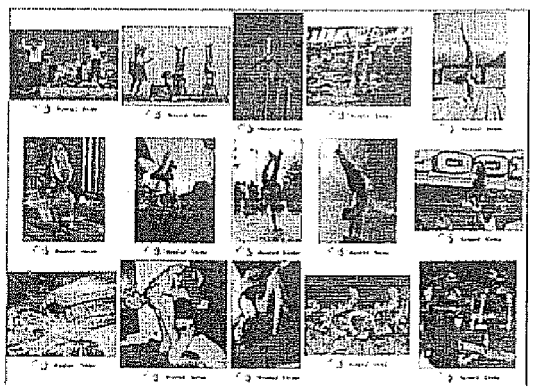
FIG. 14A shows a related images search.
Figure 14B:
FIG. 14B shows a visual similarity search.

In a given day, as many as 2,400 people used the site. Many of them used the site as an image search engine as we provide word-based search, related image search, and visual similarity search of images (FIG. 14). Many of these functions rely on the words stored for the images. In order to make the site more useful for image search, we added more than one million images from terragalleria.com and flickr.com. We used ALIPR to verify the keywords or tags provided by these sites. For reporting the accuracy of ALIPR, however, we use only those images uploaded directly by online users.

Figure 15A:
FIGS. 15A and 15B show sample results collected on the alipr.com website.
Figure 15B:
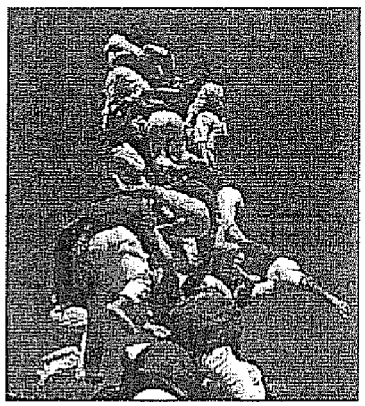
Figure 16C:
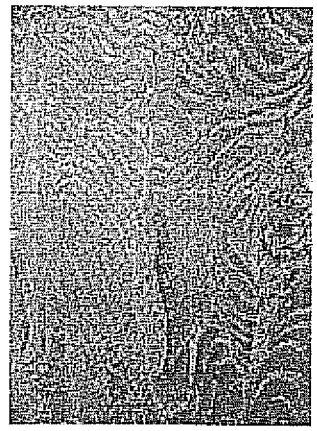
FIGS. 16A-16C show pictures of rare scenes often uploaded to the alipr.com website.
Figure 16B:
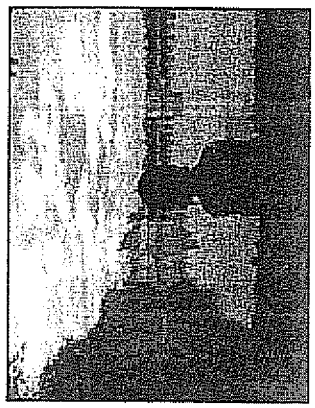
Figure 16A:
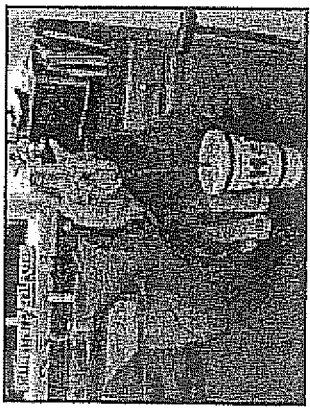

We noticed the following behaviors of the users who uploaded images:

- Many users are more stringent on considering an ALIPR-predicted word as correct. They often only check words that accurately reflect the main theme of the picture but neglect other appropriate words. For example, for the picture in FIG. 15A, the user checked the words building and car as correct words. But the user did not check other reasonable predictions including people. Similarly, for the picture in FIG. 15B, the user checked only the words people and sky. Other reasonable predictions can include sport and male.
- Users tend to upload difficult pictures just to challenge the system. Although we mentioned on the About Us page that the system was designed only for color photographic images, many people tested with gray-scale images, manipulated photos, cartoons, sketches, framed photos, computer graphics, aerial scenes, etc. Even for the photographic images, they often use images with rare scenes (FIG. 16).

Up to now, a total of 10,809 images have been uploaded with some user-checked words. On average, 2.24 words among the top 15 words predicted by ALIPR are considered correct for a picture. The users added an average of 1.67 words for each picture. A total of 3,959 unique IP addresses have been recorded for these uploaded images. The distribution of the number of correctly-predicted words and user-added words are shown in Tables I and II, respectively. A total of 295 words, among the vocabulary of 332 words in the ALIPR dictionary, have been checked by the users for some pictures.

We now prove Equation (11) gives the ML estimation for the parameters of the Gamma distributions under a common shape parameter. Recall that the total number of prototypes across all the image classes is M and the index set of images assigned to prototype j is $C_j$, j=1, ..., $\overline{M}$. We need to estimate the scale parameter $b_j$ for every prototype j and the common shape parameter s. The collection of distances is u=$(u_1, u_2, \ldots, u_N)$, $$N = \sum_{j=1}^{M} |C_j|.$$

The ML estimator maximizes the log likelihood:

$$L(u \mid s, b_1, b_2, \ldots, b_{\overline{M}}) = \sum_{j=1}^{M} \sum_{i \in C_j} \log f(u_i) \qquad (12)$$

$$= \sum_{j=1}^{M} \sum_{i \in C_j} \left[ \begin{array}{l} (s-1)\log u_i - \\ s \log b_j - \\ \frac{u_i}{b_j} - \log \Gamma(s) \end{array} \right].$$

With a fixed s, $L(u \mid s, b_1, b_2, \ldots, b_{\overline{M}})$ can be maximized individually on every $b_j$:

TABLE I

| # of tags | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| # of images | 3277 | 2824 | 2072 | 1254 | 735 | 368 | 149 | 76 | 20 | 22 | 3 | 1 | 2 | 3 | 3 |
| % | 30.3 | 26.1 | 19.2 | 11.6 | 6.8 | 3.4 | 1.4 | 0.7 | 0.2 | 0.2 | 0 | 0 | 0 | 0 | 0 |

TABLE II

| # of checked tags | 0 | 1 | 2 | 3 | 4 | 5 | 6 | 7 | 8 | 9 | 10 | 11 |
|---|---|---|---|---|---|---|---|---|---|---|---|---|
| # of images | 3110 | 3076 | 1847 | 1225 | 727 | 434 | 265 | 101 | 18 | 3 | 0 | 3 |
| % | 28.8 | 28.5 | 17.1 | 11.3 | 6.7 | 4.0 | 2.5 | 0.9 | 0.2 | 0 | 0 | 0 |

Additional Considerations

There are many directions to improve the accuracy of the system. First, the incorporation of 3-D information in the learning process can potentially improve the models. This can be done through learning via stereo images or 3-D images. Shape information can be utilized to improve the modeling process. Second, better and larger amount of training images per semantic concept may produce more robust models. Contextual information may also help in the modeling and annotation process. Third, the applications of this method to various application domains including biomedicine can be interesting. Finally, the system can be integrated with other retrieval methods to improve the usability.

$$\max L(u \mid s, b_1, b_2, \ldots, b_{\overline{M}}) = \sum_{j=1}^{M} \max \sum_{i \in C_j} \left[ \begin{array}{l} (s-1)\log u_i - \\ s \log b_j - \\ \frac{u_i}{b_j} - \log \Gamma(s) \end{array} \right]. \qquad (13)$$

Since $$\sum_{i \in C_j} \left[ (s-1)\log u_i - s \log b_j - \frac{u_i}{b_j} - \log \Gamma(s) \right]$$

is a concave function of $b_j$, its maximum is determined by setting the first derivative to zero:

$$\sum_{i \in C_j} -\frac{s}{b_j} + \frac{u_i}{b_j^2} = 0,$$

Let $$\bar{u}_j = \frac{\sum_{i \in C_j} u_i}{|C_j|}$$

be the average distance for prototype j. Then, $b_j$ is solved by $$b_j = \frac{\bar{u}_j}{s}. \quad (14)$$

Now substitute Equation (14) into (13) and suppress the dependence of L on $b_j$:

$$\max L(u \mid s) = \sum_{j=1}^{M} \max \sum_{i \in C_j} \left[ s\log s + s \cdot \left(\log\frac{u_i}{\bar{u}_j} - \frac{u_i}{\bar{u}_j}\right) - \log\Gamma(s) - \log u_i \right] \quad (15)$$

Note that log Γ(s) is a convex function of s. It is easy to show that L(u|s) is a concave function of s, and hence is maximized by setting its first derivative to zero:

$$N\log s + \sum_{j=1}^{M} \sum_{i \in C_j} \log\frac{u_i}{\bar{u}_j} - N\psi(s) = 0,$$

which is equivalent to:

$$\log \hat{s} - \psi(\hat{s}) = \log\left[\prod_{j=1}^{M} \bar{u}_j^{|C_j|/N} \Big/ \left(\prod_{i=1}^{N} u_i\right)^{1/N}\right].$$

Combining (14) and (16), we have proved the ML estimator in Equation (11).

We claim:

1. An automated image annotation method, comprising the steps of:

defining a plurality of concepts;

providing one or more images associated with each concept;

extracting a signature for each image based upon a discrete distribution of visual features associated with that image;

constructing a profiling model for each concept by clustering the discrete distributions;

storing the profiling models along with one or more textual descriptions of each concept;

inputting an image to be annotated;

extracting a signature for the image to be annotated based upon a discrete distribution of visual features associated with that image;

computing the probability that the image belongs to at least one of the concepts by comparing the discrete distribution of visual features associated with the image to annotated with the stored profiling models and, if the input image belongs to at least one of the concepts;

computing the probabilities that the textual descriptions stored with the identified profiling model apply to the image to be annotated;

ranking the textual descriptions applied to the image to be annotated; and outputting one or more of the highest-ranked textual descriptions as an annotation of the image to be annotated.

2. The method of claim 1, wherein the visual features include a color feature and a texture feature.

3. The method of claim 1, wherein one or more of the textual descriptions are single words.

4. The method of claim 1, wherein the visual features are vectors.

5. The method of claim 1, wherein the step of computing the probability that the image belongs to at least one of the concepts includes computing the Mallows distances between the discrete distributions.

6. The method of claim 1, wherein the step of constructing a profiling model for each concept is based upon mixture modeling.

7. The method of claim 1, wherein the step of constructing a profiling model for each concept further includes the steps of:

optimizing a set of prototypes for each image associated with an image category through discrete distribution clustering;

partitioning the images into the prototypes;

computing the Mallows distances between each image and the prototype to which it belongs; and constructing a mixture model for all of the images associated with each image category.

* * * * *

UNITED STATES PATENT AND TRADEMARK OFFICE
CERTIFICATE OF CORRECTION

PATENT NO. : 7,941,009 B2
APPLICATION NO. : 11/872260
DATED : May 10, 2011
INVENTOR(S) : Jia Li et al.

It is certified that error appears in the above-identified patent and that said Letters Patent is hereby corrected as shown below:

At column 6, line number 18, delete "LU", insert --LH--.

At column 6, line number 18, delete "EL", insert --HL--.

At column 6, line number 18, delete "RH", insert --HH--.

At column 6, line number 18, delete "EL", insert --HL--.

At column 8, line number 20, delete "¯D", insert -- $\tilde{D}$ --.

At column 8, line number 44, delete "¯D", insert -- $\tilde{D}$ --.

Signed and Sealed this
First Day of January, 2013

David J. Kappos
*Director of the United States Patent and Trademark Office*